US011045949B2

(12) United States Patent
Vijayanarasimhan et al.

(10) Patent No.: US 11,045,949 B2
(45) Date of Patent: *Jun. 29, 2021

(54) DEEP MACHINE LEARNING METHODS AND APPARATUS FOR ROBOTIC GRASPING

(71) Applicant: Google LLC, Mountain View, CA (US)

(72) Inventors: Sudheendra Vijayanarasimhan, Pasadena, CA (US); Eric Jang, Cupertino, CA (US); Peter Pastor Sampedro, Oakland, CA (US); Sergey Levine, Berkeley, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,947

(22) Filed: Mar. 19, 2020

(65) Prior Publication Data

US 2020/0215686 A1 Jul. 9, 2020

Related U.S. Application Data

(63) Continuation of application No. 15/881,189, filed on Jan. 26, 2018, now Pat. No. 10,639,792, which is a (Continued)

(51) Int. Cl.
G05B 19/04 (2006.01)
G05B 19/18 (2006.01)
(Continued)

(52) U.S. Cl.
CPC ............. *B25J 9/163* (2013.01); *B25J 9/1612* (2013.01); *B25J 9/1697* (2013.01);
(Continued)

(58) Field of Classification Search
CPC ........ B25J 9/1612; B25J 9/163; B25J 9/1697; B25J 13/085; B25J 13/08; B25J 13/084;
(Continued)

(56) References Cited

U.S. PATENT DOCUMENTS

| 5,579,442 A | 11/1996 | Kimoto et al. |
| 7,200,260 B1 * | 4/2007 | Watanabe ............... B25J 9/1692 382/103 |

(Continued)

FOREIGN PATENT DOCUMENTS

| CN | 102161198 | 8/2011 |
| CN | 104680508 | 6/2015 |

(Continued)

OTHER PUBLICATIONS

Pinto, L. et al. "Supersizing Self-Supervision: Learning to Grasp from 50K Tries and 700 Robot Hours." arXiv preprint arXiv:1509.06825 (2015); Pinto, Lerrel, and Abhinav Gupta. "Supersizing self-supervision: Learning to grasp from 50k tries and 700 robot hours." arXiv preprint arXiv:1509.06825 (2015); 8 pages.

(Continued)

*Primary Examiner* — Harry Y Oh
(74) *Attorney, Agent, or Firm* — Middleton Reutlinger

(57) ABSTRACT

Deep machine learning methods and apparatus related to manipulation of an object by an end effector of a robot. Some implementations relate to training a semantic grasping model to predict a measure that indicates whether motion data for an end effector of a robot will result in a successful grasp of an object; and to predict an additional measure that indicates whether the object has desired semantic feature(s). Some implementations are directed to utilization of the trained semantic grasping model to servo a grasping end effector of a robot to achieve a successful grasp of an object having desired semantic feature(s).

20 Claims, 12 Drawing Sheets

Related U.S. Application Data continuation of application No. 15/448,013, filed on Mar. 2, 2017, now Pat. No. 9,914,213.

(60) Provisional application No. 62/422,549, filed on Nov. 15, 2016, provisional application No. 62/303,139, filed on Mar. 3, 2016.

(51) Int. Cl.
*B25J 9/16* (2006.01)
*G05B 13/02* (2006.01)
*G06N 3/04* (2006.01)
*G06N 3/08* (2006.01)
*G06N 3/00* (2006.01)

(52) U.S. Cl.
CPC ........... *G05B 13/027* (2013.01); *G05B 19/18* (2013.01); *G06N 3/008* (2013.01); *G06N 3/0454* (2013.01); *G06N 3/08* (2013.01); *G06N 3/084* (2013.01); *Y10S 901/36* (2013.01)

(58) Field of Classification Search
CPC ... B25J 15/0009; B25J 5/00; B25J 9/00; B25J 9/161; B25J 9/1669; B25J 9/1671; B25J 9/1692; B25J 9/1694; G05B 13/027; G05B 2219/39543; G05B 2219/39292; G05B 2219/39298; G05B 2219/39484; G05B 2219/39523; G05B 2219/39528; G05B 2219/40053; G05B 2219/40308; G05B 2219/40499; G05B 2219/40564; G05B 2219/40571; G05B 2219/40607; G05B 2219/40609; G05B 19/18; G06N 3/0454; G06N 3/08; G06N 3/084; G06N 3/008; G06N 3/049; Y10S 901/36; Y10S 901/09; Y02P 90/02; Y02P 90/083
See application file for complete search history.

(56) References Cited

U.S. PATENT DOCUMENTS

| | | | |
|---|---|---|---|
| 8,155,479 B2 | 4/2012 | Hoffman et al. | |
| 8,204,623 B1 | 6/2012 | Bhattacharyya et al. | |
| 8,386,079 B1 | 2/2013 | Kohler et al. | |
| 8,958,912 B2 | 2/2015 | Blumberg et al. | |
| 9,050,719 B2* | 6/2015 | Valpola | B25J 13/085 |
| 9,616,568 B1 | 4/2017 | Russell | |
| 9,662,787 B1 | 5/2017 | Jackowski et al. | |
| 9,669,544 B2 | 6/2017 | Buehler et al. | |
| 9,689,696 B1 | 6/2017 | Russell | |
| 9,888,973 B2 | 2/2018 | Olson et al. | |
| 10,216,177 B2* | 2/2019 | Gildert | G05B 19/42 |
| 10,754,328 B2* | 8/2020 | Mullan | G06F 8/60 |
| 10,768,708 B1 | 9/2020 | Sills et al. | |
| 2003/0002731 A1* | 1/2003 | Wersing | G06K 9/4628 382/161 |
| 2004/0254771 A1 | 12/2004 | Riener et al. | |
| 2006/0184272 A1* | 8/2006 | Okazaki | B25J 9/1697 700/245 |
| 2007/0094481 A1 | 4/2007 | Snook et al. | |
| 2008/0009771 A1 | 1/2008 | Perry et al. | |
| 2008/0301072 A1* | 12/2008 | Nagatsuka | B25J 9/1671 706/12 |
| 2009/0099738 A1 | 4/2009 | Danko | |
| 2009/0132088 A1 | 5/2009 | Taitler | |
| 2009/0173560 A1* | 7/2009 | Nakamoto | B25J 5/00 180/167 |
| 2009/0278798 A1 | 11/2009 | Kim et al. | |
| 2010/0243344 A1 | 9/2010 | Wyrobek et al. | |
| 2011/0005342 A1 | 1/2011 | Treat et al. | |
| 2011/0043537 A1 | 2/2011 | Dellon et al. | |
| 2011/0218675 A1 | 9/2011 | Ban et al. | |
| 2012/0071333 A1 | 3/2012 | Kauffman et al. | |
| 2013/0006423 A1 | 1/2013 | Ito et al. | |
| 2013/0041508 A1 | 2/2013 | Hu et al. | |
| 2013/0054030 A1 | 2/2013 | Murakami | |
| 2013/0085387 A1 | 4/2013 | Chen et al. | |
| 2013/0343640 A1* | 12/2013 | Buehler | G06N 20/00 382/155 |
| 2014/0030955 A1 | 1/2014 | Smetanin et al. | |
| 2014/0155910 A1 | 6/2014 | Hannaford et al. | |
| 2014/0180479 A1 | 6/2014 | Argue et al. | |
| 2014/0277718 A1* | 9/2014 | Izhikevich | B25J 9/161 700/250 |
| 2014/0303452 A1 | 10/2014 | Ghaffari | |
| 2015/0138078 A1 | 5/2015 | Krupka et al. | |
| 2015/0258683 A1 | 9/2015 | Izhikevich et al. | |
| 2015/0269735 A1* | 9/2015 | Tateno | G06K 9/4609 382/153 |
| 2015/0273688 A1 | 10/2015 | Harada et al. | |
| 2015/0290454 A1 | 10/2015 | Tyler et al. | |
| 2016/0019458 A1 | 1/2016 | Kaufhold | |
| 2016/0019459 A1 | 1/2016 | Audhkhasi et al. | |
| 2016/0048741 A1 | 2/2016 | Nguyen et al. | |
| 2016/0059412 A1 | 3/2016 | Oleynik | |
| 2017/0028561 A1* | 2/2017 | Yamada | B25J 13/082 |
| 2017/0069094 A1 | 3/2017 | Kim | |
| 2017/0083796 A1 | 3/2017 | Kim et al. | |
| 2017/0106537 A1 | 4/2017 | Chizeck et al. | |
| 2017/0106542 A1 | 4/2017 | Wolf et al. | |
| 2017/0132468 A1 | 5/2017 | Mosher et al. | |
| 2017/0132496 A1 | 5/2017 | Shoaib et al. | |
| 2017/0151667 A1 | 6/2017 | Bergstra et al. | |
| 2017/0154209 A1 | 6/2017 | Nakano et al. | |
| 2017/0178485 A1 | 6/2017 | Tan et al. | |
| 2017/0185846 A1 | 6/2017 | Hwangbo et al. | |
| 2017/0213576 A1 | 7/2017 | Nugumanov et al. | |
| 2017/0252922 A1 | 9/2017 | Levine et al. | |

FOREIGN PATENT DOCUMENTS

| | | |
|---|---|---|
| JP | 06314103 | 11/1994 |
| JP | 07080790 | 3/1995 |
| JP | 2007245326 | 9/2007 |
| JP | 2012524663 | 10/2012 |
| JP | 2013052490 | 3/2013 |
| KR | 20130017123 | 2/2013 |
| KR | 20140020071 | 2/2014 |
| RU | 2361726 | 7/2009 |
| WO | 2016025189 | 2/2016 |

OTHER PUBLICATIONS

Yu, J., Weng, K., Liang, G., & Xie, G. (Dec. 2013). A vision-based robotic grasping system using deep learning for 3D object recognition and pose estimation. In Robotics and Biomimetics (ROBIO), 2013 IEEE International Conference on (pp. 1175-1180). IEEE.
Redmon, Joseph et al. "Real-time grasp detection using convolutional neural networks." Robotics and Automation (ICRA), 2015 IEEE International Conference on. IEEE, 2015. May 1, 2015.
Lenz et al. "Deep learning for detecting robotic grasps", International Journal of Robotics Research., vol. 34, No. 4-5, Mar. 16, 2015 (Mar. 16, 2015), pp. 705-724.
International Search Report and Written Opinion of PCT Ser. No. PCT/US16/66393 dated Mar. 24, 2017.
Antos et al. "Fitted Q-Iteration in Continuous Action-Space MDPs." In Advances in Neural Information Processing Systems, pp. 9-16. 2008.
Bohg et al. "Data-Driven Grasp Synthesis—A Survey." IEEE Transactions on Robotics 30, No. 2 (2014): 289-309.
Caron et al. "Photometric Visual Servoing for Omnidirectional Cameras." Autonomous Robots 35, No. 2-3 (2013): 177-193.
Chen et al. "Semantic Image Segmentation With Deep Convolutional Nets and Fully Connected CRFs." arXiv preprint arXiv:1412.7062 (2014). 14 pages.
Girshick et al. "Rich Feature Hierarchies for Accurate Object Detection and Semantic Segmentation." In Proceedings of the IEEE Conference on Computer Vision and Pattern Recognition, pp. 580-587. 2014.

(56) References Cited

OTHER PUBLICATIONS

Goldfeder et al. "The Columbia Grasp Database." In Robotics and Automation, 2009. ICRA'09. IEEE International Conference, pp. 1710-1716.
Hebert et al. "Combined Shape, Appearance and Silhouette for Simultaneous Manipulator and Object Tracking." In Robotics and Automation (ICRA), 2012 IEEE International Conference. pp. 2405-2412.
Herzog et al. "Learning of Grasp Selection Based on Shape-Templates." Autonomous Robots 36, No. 1-2 (2014): 51-65.
Hudson et al. "End-to-End Dexterous Manipulation With Deliberate Interactive Estimation." In Robotics and Automation (ICRA), 2012 IEEE International Conference, pp. 2371-2378.
Ioffe et al. "Batch Normalization: Accelerating Deep Network Training by Reducing Internal Covariate Shift." In Proceedings of the 32nd International Conference on Machine Learning, pp. 448-456. 2015.
Jagersand et al. "Experimental Evaluation of Uncalibrated Visual Servoing for Precision Manipulation." In Robotics and Automation, 1997. IEEE International Conference, vol. 4, pp. 2874-2880.
Kehoe et al. "Cloud-Based Robot Grasping With the Google Object Recognition Engine." In Robotics and Automation (ICRA), 2013 IEEE International Conference, pp. 4263-4270.
Kehoe et al. "A Survey of Research on Cloud Robotics and Automation." IEEE Transactions on Automation Science and Engineering 12, No. 2 (2015): 398-409.
Kragic et al. "Survey on Visual Servoing for Manipulation." Computational Vision and Active Perception Laboratory, 15 (2002).
Krizhevsky et al. "Imagenet Classification with Deep Convolutional Neural Networks." In Advances in Neural Information Processing Systems, pp. 1097-1105. 2012.
Wohlhart et al. "Learning Descriptors for Object Recognition and 3D Pose Estimation." In Proceedings of the IEEE Conference on Computer Vision and Pattern Recognition, pp. 3109-3118. 2015.
Yoshimi et al. "Active, Uncalibrated Visual Servoing." In Robotics and Automation, 1994. Proceedings, 1994 IEEE International Conference, pp. 156-161.
Espiau et al. "A New Approach to Visual Servoing in Robotics" Robotics and Automation, IEEE Transactions on 8, No. 3 (1992): 313-326.
Goldfeder et al. "Data-Driven Grasping With Partial Sensor Data" In Intelligent Robots and Systems, 2009. IROS 2009. IEEE/RSJ International Conference on, pp. 1278-1283.
Kappler et al. "Leveraging Big Data for Grasp Planning." In Robotics and Automation (ICRA), 2015 IEEE International Conference on, pp. 4304-4311.
Lampe et al. "Acquiring Visual Servoing Reaching and Grasping Skills Using Neural Reinforcement Learning." In Neural Networks (IJCNN), The 2013 International Joint Conference on, pp. 1-8. IEEE.
LeCun et al. "Convolutional Networks for Images, Speech, and Time Series." The Handbook of Brain Theory and Neural Networks 3361, No. 10 (1995): 1995. 14 pages.
Leeper et al. "Using Near-Field Stereo Vision for Robotic Grasping in Cluttered Environments" In Experimental Robotics, pp. 253-267. Springer Berlin Heidelberg, 2014.
Levine et al. "End-to-End Training of Deep Visuomotor Policies." arXiv preprint arXiv:1504.00702 (2015). 34 pages.
Mahler et al. "Dex-net 1.0: A Cloud-Based Network of 3D Objects for Robust Grasp Planning Using a Multi-Armed Bandit Model With Correlated Rewards." In Robotics and Automation (ICRA), 2016 IEEE International Conference, pp. 1957-1964.
Mnih et al. "Human-Level Control Through Deep Reinforcement Learning." Nature 518, No. 7540 (2015): 529-533.
Oberlin et al. "Autonomously Acquiring Instance-Based Object Models From Experience." International Symposium Robotics Research (ISRR) (2015). 16 pages.
Rodriguez et al. "From Caging to Grasping." The International Journal of Robotics Research 31, No. 7 (2012): 886-900.
Srinivasa et al. "HERB 2.0: Lessons Learned from Developing a Mobile Manipulator for the Home." Proceedings of the IEEE 100, No. 8 (2012): 1. 19 pages.
Vahrenkamp et al. "Visual Servoing for Humanoid Grasping and Manipulation Tasks." In Humanoid Robots, 2008. Humanoids 2008. 8th IEEE-RAS International Conference on, pp. 406-412.
Watter et al. "Embed to Control: A Locally Linear Latent Dynamics Model for Control From Raw Images." In Advances in Neural Information Processing Systems, pp. 2746-2754. 2015.
Weisz et al. "Pose Error Robust Grasping from Contact Wrench Space Metrics." In Robotics and Automation (ICRA), 2012 IEEE International Conference on, pp. 557-562.
Dang et al. "Semantic grasping: planning task-specific stable robotic grasps." Autonomous Robots 37.3 (2014): 301-316.
Deng et al. "Imagenet: A large-scale hierarchical image database." Computer Vision and Pattern Recognition, 2009. CVPR 2009. IEEE Conference. 8 pages.
Gualtieri et al. "High precision grasp pose detection in dense clutter." Intelligent Robots and Systems (IROS), 2016 IEEE/RSJ International Conference. 8 pages.
Gupta et al. "Using manipulation primitives for object sorting in cluttered environments." IEEE Transactions on Automation Science and Engineering 12.2 (2015): 608-614.
Jaderberg et al. "Spatial transformer networks." Advances in Neural Information Processing Systems. 2015. 9 pages.
Katz et al. "Perceiving, learning, and exploiting object affordances for autonomous pile manipulation." Autonomous Robots 37.4 (2014): 369-382.
LeCun et al. "Deep learning." Nature 521, No. 7553 (2015): 436-444.
Nikandrova et al. "Category-based task specific grasping." Robotics and Autonomous Systems 70 (2015): 25-35.
Szegedy et al. "Going deeper with convolutions." In Proceedings of the IEEE Conference on Computer Vision and Pattern Recognition (pp. 1-9) (2015).
Ungerleider et al. "'What' and 'Where' in the Human Brain." Current Opinion in Neurobiology 4.2 (1994): 157-165.
Inaba et al. "A Platform for Robotics Research Based on the Remote-Brained Robot Approach." The International Journal of Robotics Research 19, No. 10 (2000): 933-954.
Lillicrap et al. Continuous Control with Deep Reinforcement Learning. In International Conference on Learning Representations (2016). 14 pages.
Lillicrap et al. "The Cross-Entropy Method: A Unified Approach to Combinatorial Optimization, Monte-Carlo Simulation and Machine Learning." Springer-Verlag (2004). 316 pages.
Lampe et al. "Acquiring Visual Servoing Reaching and Grasping Skills Using Neural Reinforcement Learning." In Neural Networks (IJCNN), The 2013 International Joint Conference on, pp. 1-8. IEEE, 2013.
Siciliano et al. Springer Handbook of Robotics. Springer-Verlag New York, Inc., Secaucus, NJ, USA, 2007. 57 pages.
Kuffner et al. "Cloud-Enabled Robots." In IEEE-RAS International Conference on Humanoid Robotics, 2010. 28 pages.
Mohta et al. "Vision-Based Control of a Quadrotor for Perching on Lines." In Robotics and Automation (ICRA), 2014 IEEE International Conference on, pp. 3130-3136.
Wilson et al. "Relative End-Effector Control Using Cartesian Position Based Visual Servoing." IEEE Transactions on Robotics and Automation 12, No. 5 (1996): 684-696.
International Search Report and Written Opinion of PCT Ser. No. PCT/US17/20455 dated Jun. 9, 2017.
Written Opinion of the International Preliminary Examining Authority for IA No. PCT/US16/66393 dated Feb. 7, 2018.
European Patent Office; International Preliminary Report on Patentability of International Application No. PCT/US2016/066393 dated Jun. 13, 2018.
The Korean Intellectual Property Office; Office Action issued in Application No. 10-2018-7028530 dated Feb. 18, 2019.
The Korean Intellectual Patent Office; Office Action issued in Application No. 10-2018-7027695 dated Feb. 18, 2019.
Japan Patent Office; Office Action issued in Application No. 2018-545901 dated Mar. 18, 2019.

(56) References Cited

OTHER PUBLICATIONS

European Patent Office; Examination Report issued in Application No. 16822854.2 dated Mar. 29, 2019.
China National Intellectual Property Administration, Office Action issued in Application No. 201780018883.0, dated May 31, 2019.
The Korean Intellectual Property Office; Notice of Allowance issued in Application No. 10-2018-7028530 dated Jun. 19, 2019.
The Korean Intellectual Property Office; Notice of Allowance issued in Application No. 10-2018-7027695 dated Jun. 19, 2019.
China National Intellectual Property Administration, Office Action issued in Application No. 201680083745.6, dated Jun. 3, 2019.
Japan Patent Office; Office Action issued in Application No. 2018-545896, dated Mar. 18, 2019.
Japan Patent Office; Notice of Allowance issued in Application No. 2018-545896, dated Aug. 9, 2019.
Yusuke Niitani, Semantic Image Segmentation and Three-Dimentional Edge Extraction for Picking from Article Shelf, The 34th Annual Conference on Robotics Society of Japan Proceeding DVD-ROM 2016, Japan, Robotics Society of Japan, Sep. 7, 2016, RSJ2016AC2G2-03.
Japan Patent Office; Notice of Allowance issued in Application No. 2018-545901 dated Aug. 9, 2019.
China National Intellectual Property Administration, Notice of Allowance issued in Application No. 201680083745.6, dated Nov. 12, 2019.
Canadian Intellectual Property Office, Notice of Allowance issued in Application No. 3,016,418, dated Sep. 3, 2019.
China National Intellectual Property Administration, Second Office Action issued in Application No. 201780018883.0, dated Nov. 12, 2019.
China National Intellectual Property Administration, Notification for Patent Registration Formalities issued in Application No. 201780018883.0, dated Apr. 2, 2020.
European Patent Office; Communication Pursuant Article 94(3) EPC issue in Application No. 17711906.2; 8 pages; dated Jan. 25, 2021.

* cited by examiner

DEEP MACHINE LEARNING METHODS AND APPARATUS FOR ROBOTIC GRASPING

BACKGROUND

Many robots are programmed to utilize one or more end effectors to grasp one or more objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

This specification is directed generally to deep machine learning methods and apparatus related to manipulation of an object by an end effector of a robot. Some implementations are directed to training a grasp deep neural network, such as a convolutional neural network (also referred to herein as a "CNN"), to predict the probability that candidate motion data for an end effector of a robot will result in a successful grasp of one or more objects by the end effector and/or to predict spatial transformation parameters for a spatial transformer network (also referred to herein as a "STN"). For example, some implementations enable applying, as input to a trained grasp deep neural network, at least: (1) a candidate motion vector that defines a candidate motion (if any) of a grasping end effector of a robot and (2) an image that captures at least a portion of the work space of the robot; and generating, based on the applying: (1) a measure that directly or indirectly indicates the probability that the candidate motion vector will result in a successful grasp; and/or (2) spatial transformation parameters that indicate a location in the image (or an additional image) toward which the grasping end effector will move. The measure indicating the probability and/or the spatial transformation parameters may then be used in servoing performance of grasp attempts by a robot having a grasping end effector, thereby improving the ability of the robot to successfully grasp objects in its environment.

Some of those implementations are further directed to training a spatial transformer network to generate a spatial transformation of an image based on received spatial transformation parameters and/or to training a semantic deep neural network (e.g., semantic CNN) to predict, based on the spatial transformation, a class (and/or other semantic feature(s)) of an object in the spatial transformation. In some versions of those implementations, the semantic deep neural network may be trained based on both: training examples generated based on grasp attempts by one or more robots; and training examples from other computer vision datasets that include training examples not generated based on grasp attempts by one or more robots (e.g., training examples from the IMAGENET image database). Using training examples from other computer vision datasets may increase the accuracy and/or breadth of semantic understanding of the semantic deep neural network.

Some implementations are directed to utilization of the trained grasp deep neural network, the trained spatial transformer network, and/or the trained semantic deep neural network to servo a grasping end effector of a robot to achieve a successful grasp, of an object having desired semantic object features, by the grasping end effector. For example, the various trained networks may be utilized in the iterative updating of motion control commands for one or more actuators of a robot that control the pose of a grasping end effector of the robot, and to determine when to generate grasping control commands to effectuate an attempted grasp by the grasping end effector. For instance, grasping control commands may only be generated and provided to corresponding actuators when output generated over the grasping deep neural network indicates that a likelihood of successful grasp satisfies a threshold and when output generated over the semantic deep neural network indicates that the grasp will likely be of an object having desired semantic object feature(s).

Using trained network(s) to achieve a successful grasp of an object having desired semantic object features may enable a robot to perform various actions directed to objects having particular object feature(s), where those particular object feature(s) are dictated by human generated user interface input and/or by another component (e.g., a higher level task planner). For example, a user may provide user interface input (e.g., spoken, typed) that indicates a desire to grasp an object having one or more particular object feature(s) and the robot may utilize the trained networks to attempt a grasp only when: the grasp is likely to be successful and is likely to be of an object having the particular object feature(s). For instance, the user may provide user interface input of "pick up the spoon" and the robot may attempt a grasp based on output generated over the grasp deep neural network indicating a grasp is likely to be successful and based on output generated over the semantic deep neural network indicating the grasp is likely to be of an object having a classification of "spoon".

In some implementations, a method is provided that includes: generating a candidate end effector motion vector defining motion to move a grasping end effector of a robot from a current pose to an additional pose; and identifying a current image captured by a vision sensor associated with the robot. The current image captures the grasping end effector and at least one object in an environment of the robot. The method further includes: applying the current image and the candidate end effector motion vector as input to a trained grasp convolutional neural network; generating, over the trained grasp convolutional neural network, a measure of successful grasp of the object with application of the motion. The measure is generated based on the application of the image and the end effector motion vector to the trained grasp convolutional neural network. The method further includes identifying a desired object semantic feature; applying, as input to a semantic convolutional neural network, a spatial transformation of the current image or of an additional image captured by the vision sensor; and generating, over the semantic convolutional neural network based on the spatial transformation, an additional measure that indicates whether the desired object semantic feature is present in the spatial transformation. The method further includes generating an end effector command based on the measure of successful grasp and the additional measure that indicates whether the desired object semantic feature is present; and providing the end effector command to one or more actuators of the robot.

These and other implementations may include on or more of the following features.

In some implementations, the method further includes: generating, over the trained grasp convolutional neural network based on the application of the image and the end effector motion vector to the trained grasp convolutional neural network, spatial transformation parameters; and generating the spatial transformation over a spatial transformation network based on the spatial transformation parameters.

In some implementations, the desired object semantic feature defines an object classification.

In some implementations, the method further includes receiving user interface input from a user interface input device and identifying the desired object semantic feature based on the user interface input. In some of those implementations, the user interface input device is a microphone, such as a microphone of the robot.

In some implementations, the spatial transformation is of the current image, such as a spatial transformation that crops out a portion of the current image.

In some implementations, the method further includes: determining a current measure of successful grasp of the object without application of the motion. In some of those implementations, generating the end effector command based on the measure includes generating the end effector command based on comparison of the measure to the current measure. In some versions of those implementations, the end effector command is a grasp command and generating the grasp command is in response to: determining that the additional measure indicates that the desired object feature is present in the spatial transformation; and determining that comparison of the measure to the current measure satisfies one or more criteria.

In some implementations, the end effector command is an end effector motion command and generating the end effector motion command includes generating the end effector motion command to conform to the candidate end effector motion vector.

In some implementations, the end effector command is an end effector motion command and conforms to the candidate end effector motion vector. In some of those implementations, providing the end effector motion command to the one or more actuators moves the end effector to a new pose, and the method further includes: generating an additional candidate end effector motion vector defining new motion to move the grasping end effector from the new pose to a further additional pose; identifying a new image captured by a vision sensor associated with the robot, the new image capturing the end effector at the new pose and capturing the objects in the environment; applying the new image and the additional candidate end effector motion vector as input to the trained grasp convolutional neural network; generating, over the trained grasp convolutional neural network, a new measure of successful grasp of the object with application of the new motion, the new measure being generated based on the application of the new image and the additional end effector motion vector to the trained grasp convolutional neural network; applying, as input to the semantic convolutional neural network, an additional spatial transformation of the new image or a new additional image captured by the vision sensor; generating, over the semantic convolutional neural network based on the additional spatial transformation, a new additional measure that indicates whether the desired object feature is present in the spatial transformation; generating a new end effector command based on the new measure of successful grasp and the new additional measure that indicates whether the desired object feature is present; and providing the new end effector command to one or more actuators of the robot.

In some implementations, applying the image and the candidate end effector motion vector as input to the trained grasp convolutional neural network includes: applying the image as input to an initial layer of the trained grasp convolutional neural network; and applying the candidate end effector motion vector to an additional layer of the trained grasp convolutional neural network. The additional layer can be downstream of the initial layer.

In some implementations, generating the candidate end effector motion vector includes: generating a plurality of candidate end effector motion vectors; and performing one or more iterations of cross-entropy optimization on the plurality of candidate end effector motion vectors to select the candidate end effector motion vector from the plurality of candidate end effector motion vectors.

In some implementations, a method is provided that includes: identifying a current image captured by a vision sensor associated with a robot; and generating, over a grasp convolutional neural network based on application of the current image to the grasp convolutional neural network: a measure of successful grasp, by a grasping end effector of the robot, of an object captured in the current image; and spatial transformation parameters. The method further includes: generating, over a spatial transformer network, a spatial transformation based on the spatial transformation parameters. The spatial transformation is of the current image or an additional image captured by the vision sensor. The method further includes: applying the spatial transformation as input to a semantic convolutional neural network; generating, over the semantic convolutional neural network based on the spatial transformation, an additional measure that indicates whether a desired object semantic feature is present in the spatial transformation; generating an end effector command based on the measure and the additional measure; and providing the end effector command to one or more actuators of the robot.

In some implementations, a method is provided that includes: identifying a current image captured by a vision sensor of a robot; and generating, over a portion of a semantic grasping model based on application of the current image to the portion: a measure of successful grasp, by a grasping end effector of the robot, of an object captured in the current image; and spatial transformation parameters. The method further includes: generating a spatial transformation of the current image based on the spatial transformation parameters; applying the spatial transformation as input to an additional portion of the semantic grasping model; generating, over the additional portion based on the spatial transformation, an additional measure that indicates whether a desired object semantic feature is present in the spatial transformation; generating an end effector command based on the measure and the additional measure; and providing the end effector command.

In some implementations, a method is provided that includes identifying a plurality of training examples generated based on sensor output from one or more robots during a plurality of grasp attempts by the robots. Each of the training examples includes training example input that includes: an image for a corresponding instance of time of a corresponding grasp attempt of the grasp attempts, the image capturing a robotic end effector and one or more environmental objects at the corresponding instance of time; and an end effector motion vector defining motion of the end effector to move from an instance of time pose of the end effector at the corresponding instance of time to a final pose of the end effector for the corresponding grasp attempt. Each of the training examples further include training example output that includes: at least one grasped object label indicating a semantic feature of an object grasped by the corresponding grasp attempt. The method further includes training, by one or more of the processors, a semantic convolutional neural network based on the training examples.

These and other implementations may include on or more of the following features.

In some implementations, training the semantic convolutional neural network based on the training examples includes: applying, to a grasp convolutional neural network, the training example input of a given training example of the training examples; generating, over the grasp convolutional neural network based on the training example input of the given training example, spatial transformer network parameters; using the spatial transformer network parameters to generate a spatial transformation of the image of the given training example; generating output over the semantic convolutional neural network based on the spatial transformation image; and performing backpropagation on the semantic convolutional neural network based on the output and the training example output of the given training example. In some of those implementations, the method further includes training the semantic convolutional neural network based on additional training examples that are not generated based on grasp attempts. In some of those implementations, applying the training example input of the given training example to the grasp convolutional neural network includes: applying the image of the given training example as input to an initial layer of the grasp convolutional neural network; and applying the end effector motion vector of the given training example to an additional layer of the grasp convolutional neural network that is downstream of the initial layer.

In some implementations, the method further includes training the semantic convolutional neural network based on additional training examples that are not generated based on grasp attempts. In some of those implementations, the method further includes training the grasp convolutional neural network based on the training examples. In some versions of those implementations, training the grasp convolutional neural network based on the training examples includes: generating, over the grasp convolutional neural network based on the training example input of the given training example, a predicted grasp measure; and performing backpropagation on the grasp convolutional neural network based on the predicted grasp measure and the training example output of the given training example.

In some implementations, the training examples include: a first group of the training examples generated based on output from a plurality of first robot sensors of a first robot during a plurality of the grasp attempts by the first robot; and a second group of the training examples generated based on output from a plurality of second robot sensors of a second robot during a plurality of the grasp attempts by the second robot. In some of those implementations, the first robot sensors include a first vision sensor generating the images for the training examples of the first group, the second robot sensors include a second vision sensor generating the images for the training examples of the second group, and a first pose of the first vision sensor relative to a first base of the first robot is distinct from a second pose of the second vision sensor relative to a second base of the second robot.

In some implementations, the grasp attempts on which a plurality of training examples are based each include a plurality of random actuator commands that randomly move the end effector from a starting pose of the end effector to the final pose of the end effector, then grasp with the end effector at the final pose.

In some implementations, a method is provided that includes identifying a semantic convolutional neural network trained based on training examples not generated based on robotic grasp attempts; identifying a plurality of training examples generated based on sensor output from one or more robots during a plurality of grasp attempts by the robots; and training the semantic convolutional neural network based on the training examples.

These and other implementations may include on or more of the following features In some implementations, the method further includes training a grasp convolutional neural network based on the training examples.

In some implementations, the training examples include: a first group of the training examples generated based on output from a plurality of first robot sensors of a first robot during a plurality of the grasp attempts by the first robot; and a second group of the training examples generated based on output from a plurality of second robot sensors of a second robot during a plurality of the grasp attempts by the second robot. In some of those implementations, the first robot sensors include a first vision sensor generating the images for the training examples of the first group, the second robot sensors include a second vision sensor generating the images for the training examples of the second group, and a first pose of the first vision sensor relative to a first base of the first robot is distinct from a second pose of the second vision sensor relative to a second base of the second robot.

In some implementations, the grasp attempts on which a plurality of training examples are based each include a plurality of random actuator commands that randomly move the end effector from a starting pose of the end effector to the final pose of the end effector, then grasp with the end effector at the final pose.

Other implementations may include a non-transitory computer readable storage medium storing instructions executable by a processor (e.g., a central processing unit (CPU) or graphics processing unit (GPU)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
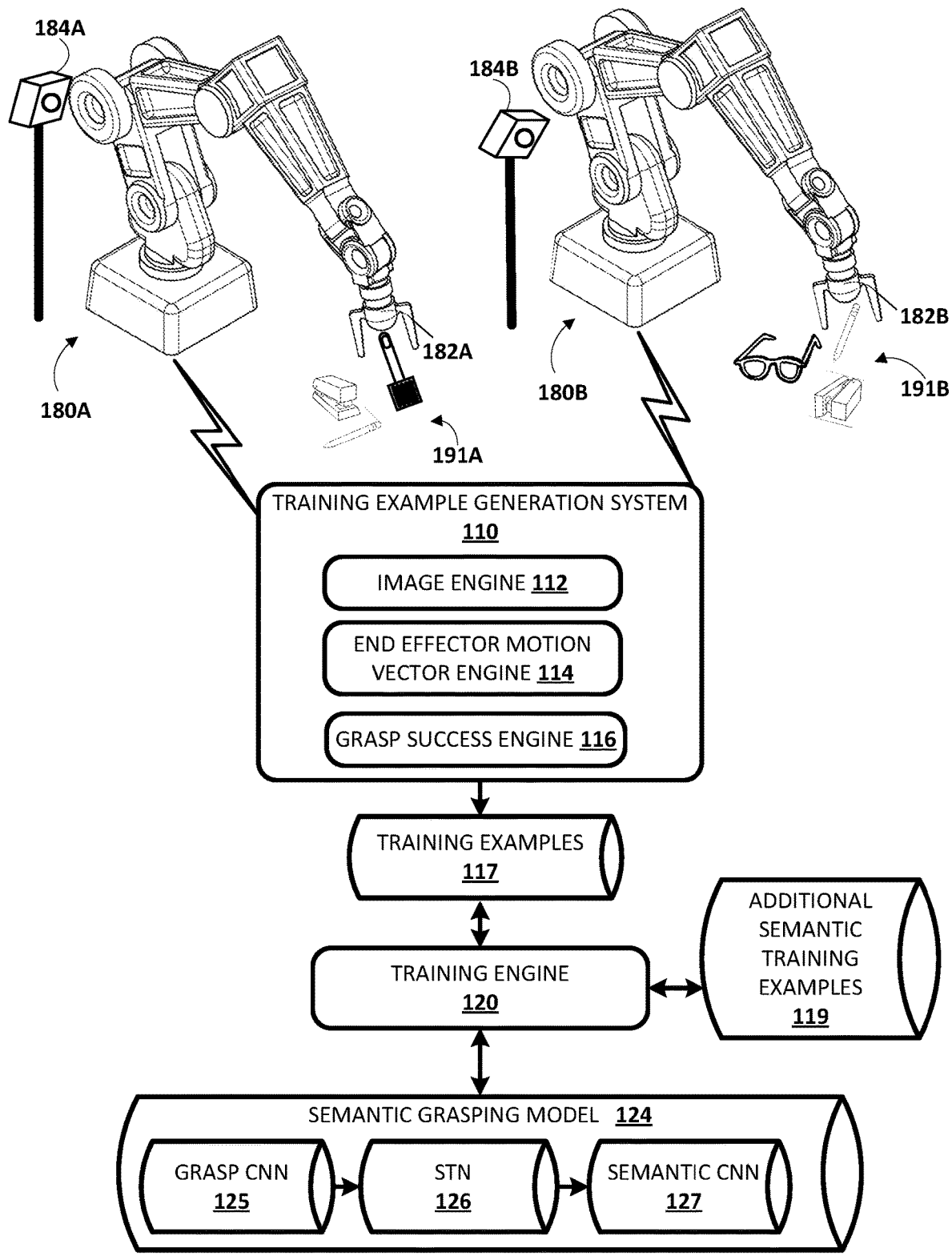
FIG. 1A illustrates an example environment in which grasp attempts may be performed by robots, data associated with the grasp attempts may be utilized to generate training examples, and/or the training examples may be utilized to train one or more networks of a semantic grasping model.

Some implementations of the technology described herein are directed to training a semantic grasping model that includes a grasp deep neural network, a spatial transformer network, and a semantic deep neural network.

In some of those implementations, the trained grasp deep neural network may be utilized to generate, based on a current image captured by a vision sensor associated with a robot: 1) a measure indicating a probability of successful grasp of one or more objects by the end effector; and 2) spatial transformation parameters. Further, the trained spatial transformer network may be utilized to generate, based on the spatial transformation parameters and the current image (and/or an additional image): a spatial transformation of the current image (and/or the additional image). Yet further, the trained semantic deep neural network may be utilized to generate, based on the spatial transformation: additional measure(s) indicating one or more semantic feature(s) of the spatial transformation, such as one or more classes of object(s) present in the spatial transformation.

In some versions of those implementations, the robot may attempt a grasp with the end effector based on the measure (indicating the probability of successful grasp) satisfying a threshold and based on the additional measures indicating that desired object semantic features are present in the spatial transformation. The desired object semantic features may be based on, for example, user interface input and/or input from one or more separate components. Accordingly, the trained semantic grasping model may enable a grasp attempt to be performed on an object based on determining that a likelihood of success of the grasp attempt satisfies a threshold and based on determining that the object is likely to have the desired object semantic features.

As described in more detail herein, in various implementations output generated over the grasp deep neural network may be viewed as "dorsal" in that it is based largely on spatial reasoning and predicts whether a grasp will be successful and/or which part of an image to process, without semantic understanding of what will be grasped. Moreover, in various implementations output generated over the spatial transformer network and the semantic deep neural network may be viewed as "ventral" in that it is based largely on semantic reasoning and predicts semantic feature(s) of an object considered for grasping.

In some implementations, the trained grasp deep neural network accepts image(s) ($I_t$ and optionally $I_o$) and accepts an end effector motion vector ($v_t$), such as a task-space motion vector. The image(s) are generated by a vision sensor and may include a "current" image ($I_t$) and an additional image ($I_o$) that captures the scene without the grasping end effector present (or with the end effector at a different pose than it is at in the current image ($I_t$)). The application of the image(s) ($I_t$ and optionally $I_o$) and the end effector motion vector ($v_t$) to the trained grasp deep neural network may be used to generate, over the grasp deep neural network: a predicted measure that executing command(s) to implement the motion defined by motion vector ($v_t$), and subsequently grasping, will produce a successful grasp; and predicted spatial transformation parameters. The generated spatial transformation parameters may be utilized to generate a spatial transform (e.g., of the current image) over the trained spatial transform network. The spatial transform may be applied to the semantic deep neural network to generate, over that network, measure(s) indicating feature(s) of an object present in the spatial transform. Whether a grasp is attempted by a grasping end effector may be based on the predicted measure of a successful grasp and/or which feature(s) are indicted as present in the spatial transform. Additional description of these and other implementations of the technology is provided below.

With reference to FIGS. 1A-6B, various implementations of training various networks 125, 126, and/or 127 of a semantic grasping model 124 are described. FIG. 1A illustrates an example environment in which grasp attempts may be performed by robots (e.g., robots 180A, 180B, and/or other robots), data associated with the grasp attempts may be utilized to generate training examples, and/or the training examples may be utilized to train various networks 125, 126, and/or 127 of the semantic grasping model 124.

Figure 2:
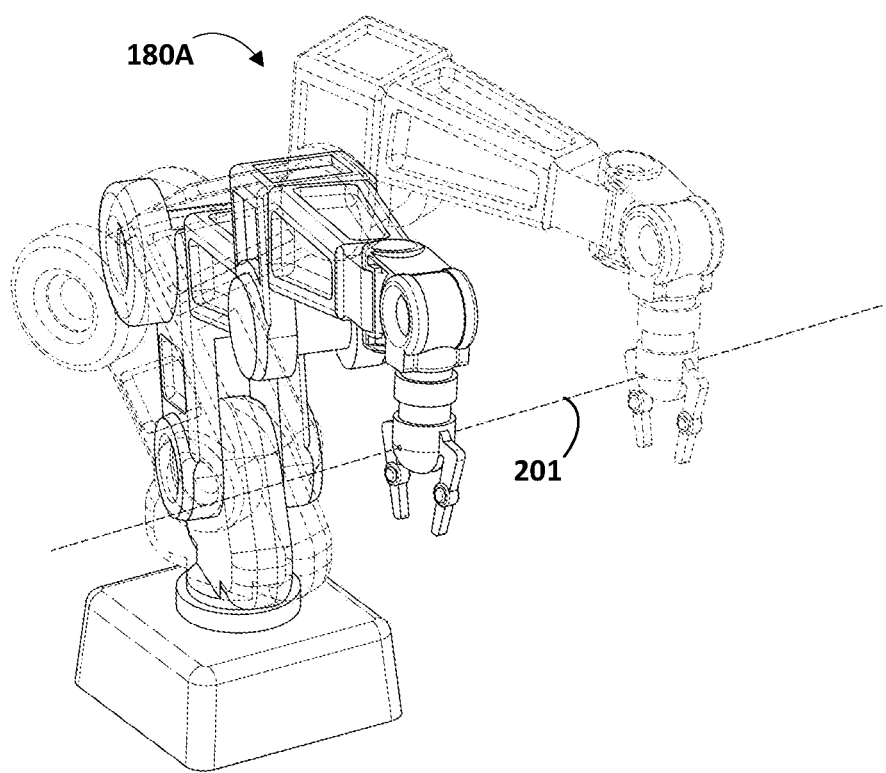
FIG. 2 illustrates one of the robots of FIG. 1 and an example of movement of a grasping end effector of the robot along a path.

Example robots 180A and 180B are illustrated in FIG. 1A. Robots 180A and 180B are "robot arms" having multiple degrees of freedom to enable traversal of grasping end effectors 182A and 182B along any of a plurality of potential paths to position the grasping end effectors 182A and 182B in desired locations. For example, with reference to FIG. 2, an example of robot 180A traversing its end effector along a path 201 is illustrated. FIG. 2 includes a phantom and non-phantom image of the robot 180A showing two different poses of a set of poses struck by the robot 180A and its end effector in traversing along the path 201. Referring again to FIG. 1A, robots 180A and 180B each further controls the two opposed "claws" of their corresponding grasping end effector 182A, 182B to actuate the claws between at least an open position and a closed position (and/or optionally a plurality of "partially closed" positions).

Example vision sensors 184A and 184B are also illustrated in FIG. 1A. In FIG. 1A, vision sensor 184A is mounted at a fixed pose relative to the base or other stationary reference point of robot 180A. Vision sensor 184B is also mounted at a fixed pose relative to the base or other stationary reference point of robot 180B. As illustrated in FIG. 1A, the pose of the vision sensor 184A relative to the robot 180A is different than the pose of the vision sensor 184B relative to the robot 180B. As described herein, in some implementations this may be beneficial to enable generation of varied training examples that can be utilized to train a neural network that is robust to and/or independent of camera calibration. Vision sensors 184A and 184B are sensors that can generate images related to shape, color, depth, and/or other features of object(s) that are in the line of sight of the sensors. The vision sensors 184A and 184B may be, for example, monographic cameras, stereographic cameras, and/or 3D laser scanners. A 3D laser scanner includes one or more lasers that emit light and one or more sensors that collect data related to reflections of the emitted light. A 3D laser scanner may be, for example, a time-of-flight 3D laser scanner or a triangulation based 3D laser scanner and may include a position sensitive detector (PSD) or other optical position sensor.

The vision sensor 184A has a field of view of at least a portion of the workspace of the robot 180A, such as the portion of the workspace that includes example objects 191A. Although resting surface(s) for objects 191A are not illustrated in FIG. 1A, those objects may rest on a table, a tray, and/or other surface(s). Objects 191A include a spatula, a stapler, and a pencil. In other implementations more objects, fewer objects, additional objects, and/or alternative objects may be provided during all or portions of grasp attempts of robot 180A as described herein. For example, in some implementations objects having one or more of the features that are the same (e.g., objects all having a first classification) may be provided during some grasp attempts of robot 180A, objects having one or more different features that are the same (e.g., objects all having a second classification) may be provided during some other grasp attempts of robot 180A, etc.

The vision sensor 184B has a field of view of at least a portion of the workspace of the robot 180B, such as the portion of the workspace that includes example objects 191B. Although resting surface(s) for objects 191B are not illustrated in FIG. 1A, they may rest on a table, a tray, and/or other surface(s). Objects 191B include a pencil, a stapler, and glasses. In other implementations more objects, fewer objects, additional objects, and/or alternative objects may be provided during all or portions of grasp attempts of robot 180B as described herein. For example, in some implementations objects having one or more of the features that are the same (e.g., objects all having a first classification) may be provided during some grasp attempts of robot 180B, objects having one or more different features that are the same (e.g., objects all having a second classification) may be provided during some other grasp attempts of robot 180B, etc.

Although particular robots 180A and 180B are illustrated in FIG. 1A, additional and/or alternative robots may be utilized, including additional robot arms that are similar to robots 180A and 180B, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1A, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although particular mountings of vision sensors 184A and 184B are illustrated in FIG. 1A, additional and/or alternative mountings may be utilized. For example, in some implementations, vision sensors may be mounted directly to robots, such as on non-actuable components of the robots or on actuable components of the robots (e.g., on the end effector or on a component close to the end effector). Also, for example, in some implementations, a vision sensor may be mounted on a non-stationary structure that is separate from its associated robot and/or may be mounted in a non-stationary manner on a structure that is separate from its associated robot.

Robots 180A, 180B, and/or other robots may be utilized to perform a large quantity of grasp attempts and data associated with the grasp attempts may be utilized by the training example generation system 110 to generate training examples of training examples database 117. In some implementations, all or aspects of training example generation system 110 may be implemented on robot 180A and/or robot 180B (e.g., via one or more processors of robots 180A and 180B). For example, robots 180A and 180B may each include an instance of the training example generation system 110. In some implementations, all or aspects of training example generation system 110 may be implemented on one or more computer systems that are separate from, but in network communication with, robots 180A and 180B.

Each grasp attempt by robot 180A, 180B, and/or other robots consists of T separate time steps or instances. At each time step, a current image ($I_t^i$) captured by the vision sensor of the robot performing the grasp attempt is stored, the current pose ($p_t^i$) of the end effector is also stored, and the robot chooses a path (translational and/or rotational) along which to next move the gripper. At the final time step T, the robot actuates (e.g., closes) the gripper and stores additional data and/or performs one or more additional actions to enable evaluation of the success of the grasp. The grasp success engine 116 of training example generation system 110 evaluates the success of the grasp, generating a grasp success label ($sl_i$) and/or grasped object label(s) ($ol_i$), where the grasped object label(s) indicates feature(s) of a grasped object (if any object is actually grasped).

Each grasp attempt results in T training examples, represented by ($I_t^i$, $p_T^i$-$p_t^i$, $sl_i$, $ol_i$) or ($I_t^i$, $p_T^i$-$p_t^i$, $sl_i$, $ol_i$). That is, each training example includes at least the image observed at that time step ($I_t^i$), the end effector motion vector ($p_T^i$-$p_t^i$) from the pose at that time step to the one that is eventually reached (the final pose of the grasp attempt), and the grasp success label ($l_i$) and/or grasped object label(s) ($ol_i$) of the grasp attempt. Each end effector motion vector may be determined by the end effector motion vector engine 114 of training example generation system 110. For example, the end effector motion vector engine 114 may determine a transformation between the current pose and the final pose of the grasp attempt and use the transformation as the end effector motion vector. The training examples for the plurality of grasp attempts of a plurality of robots are stored by the training example generation system 110 in training examples database 117.

The data generated by sensor(s) associated with a robot and/or the data derived from the generated data may be stored in one or more non-transitory computer readable media local to the robot and/or remote from the robot. In some implementations, the current image may include multiple channels, such as a red channel, a blue channel, a green channel, and/or a depth channel. Each channel of an image defines a value for each of a plurality of pixels of the image, such as a value from 0 to 255 for each of the pixels of the image. In some implementations, each of the training examples may include the current image and an additional image for the corresponding grasp attempt, where the additional image does not include the grasping end effector or includes the end effector in a different pose (e.g., one that does not overlap with the pose of the current image). For instance, the additional image may be captured after any preceding grasp attempt, but before end effector movement for the grasp attempt begins and when the grasping end effector is moved out of the field of view of the vision sensor. The current pose and the end effector motion vector from the current pose to the final pose of the grasp attempt may be represented in task-space, in joint-space, or in another space. For example, the end effector motion vector may be represented by five values in task-space: three values defining the three-dimensional (3D) translation vector, and two values representing a sine-cosine encoding of the change in orientation of the end effector about an axis of the end effector.

In some implementations, the grasp success label is a binary label, such as a "0/successful" or "1/not successful" label. In some implementations, the grasp success label may be selected from more than two options, such as 0, 1, and one or more values between 0 and 1. For example, "0" may indicate a confirmed "not successful grasp", "1" may indicate a confirmed successful grasp, "0.25" may indicate a "most likely not successful grasp" and "0.75" may indicate a "most likely successful grasp."

In some implementations, the grasped object label(s) each indicate whether a corresponding feature is present in a corresponding grasped object. For example, a grasped object label for a grasped object may indicate to which of one or more object classes the object belongs. Object classes of various granularities may be utilized. The grasped object labels may each be binary (e.g., feature present or not present) or selected from more than two options (e.g., feature likely not present, most likely not present, likely present, most likely present). As described herein, the grasp success engine 116 may utilize one or more techniques to assign a grasped object label to a grasp attempt. For example, the grasp success engine 116 may assign a grasped object label to a grasp attempt based on that grasp attempt being from a collection of objects all having that label (e.g., a "toothbrush" label when an object is grasped from a plurality of objects that are all "toothbrushes"). Also, for example, the grasp success engine 116 may capture an image of an object grasped in a grasp attempt (e.g., by moving the grasping end effector in front of a vision sensor while it is still grasping the object), and utilize the captured image to determine the grasped object label. For instance, the grasp success engine 116 may provide the captured image to computing devices of one or more human reviewers and utilize input from the one or more human reviewers (via their corresponding computing devices) to determine the grasped object label. Also, for instance, the grasp success engine 116 may apply the captured image (or a spatial transformation thereof) to a trained semantic CNN (optionally separate from semantic CNN 127) and use output generated over the trained semantic CNN to determine the grasped object label. In some of those instances, the trained semantic CNN may optionally be trained based on human reviewer labeled captured images (e.g., training examples having training example input based on the captured images and training example output based on the human reviewer labels) and/or additional training examples (e.g., training examples from IMAGENET).

The training engine 120 trains one or more of the networks 125, 126, and 127 of semantic grasping model 124 based on the training examples of training examples database 117. The training engine 120 may utilize some training examples of training examples database 117 to train only the grasp CNN 125. For example, some training examples of training examples database 117 may include an image observed at a corresponding time step ($I_t^i$), an end effector motion vector ($p_T^i$-$p_t^i$) from the pose at that time step to the one that is eventually reached (the final pose of the grasp attempt), and the grasp success label ($l_i$)—but not include a grasped object label(s) ($ol_i$) of the grasp attempt (e.g., because the grasp was not successful and/or because a label was not applied to a successful grasp).

The training engine 120 may also utilize some other training examples of training examples database 117 to additionally or alternatively train the grasp CNN and the STN 126 and/or the semantic CNN 127. For example, some training examples of training examples database 117 may include an image observed at a corresponding time step ($I_t^i$), an end effector motion vector ($p_T^i$-$p_t^i$) from the pose at that time step to the one that is eventually reached (the final pose of the grasp attempt), the grasp success label ($l_i$), and also include a grasped object label(s) ($ol_i$) of the grasp attempt.

In some implementations, the training engine 120 also utilizes additional training examples from semantic training examples database 119 to train the semantic CNN 127. The training examples of database 119 may include training examples from other computer vision datasets that include training examples not generated based on grasp attempts by one or more robots (e.g., training examples from the IMAGENET image database). In some of those implementations, the additional training examples of database 119 may be utilized to train the semantic CNN 127 prior to any training based on training examples generated based on grasp attempts. Further, in some implementations, the semantic CNN 127 may be pre-trained utilizing such additional training examples. For instance, the semantic CNN 127 may be a pre-trained object recognition network such as an Inception network trained on IMAGENET data. Using the additional training examples from other computer vision datasets may increase the accuracy and/or breadth of semantic understanding of the semantic CNN 127. The training engine 120 may optionally utilize various domain adaptation techniques in training the semantic CNN 127 based on the additional training examples and/or based on the training examples generated based on grasp attempts.

Additional description of implementations of performing grasp attempts, generating training data based on the grasp attempts, and training the semantic grasping network 124 is provided below with reference to FIGS. 3-5.

Figure 1B:
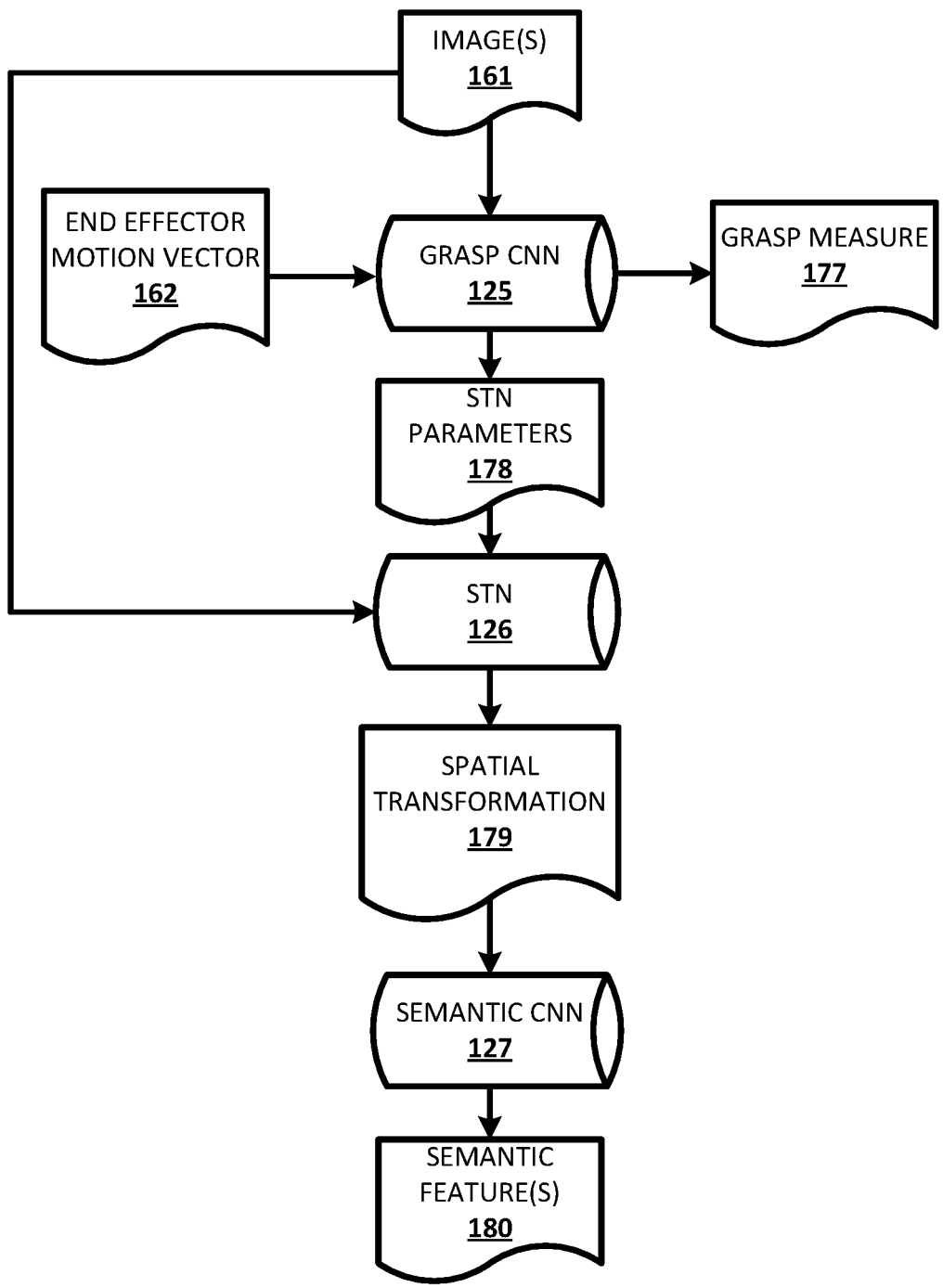
FIG. 1B illustrates the networks of the semantic grasping model of FIG. 1A, and example data that may be applied to, and generated over, the networks.

FIG. 1B illustrates the networks 125, 126, and 127 of the semantic grasping model 124 of FIG. 1A, and example data that may be applied to, and generated over, trained versions of the networks 125, 126, and 127. For example, one or more processors of a robot may apply and/or generate the data of FIG. 1B based on the networks 125, 126, and 127. For instance, the one or more processors may apply and/or generate the data of FIG. 1B during a given iteration (e.g., control cycle) that is preceded and/or followed by other iteration(s) where corresponding data is likewise generated and/or applied.

One or more images 161 are applied as input to the grasp CNN 125, such as a current image and optionally an additional image (e.g., an image that captures the same scene as the current image but omits the grasping end effector). An end effector motion vector 162 is also applied to the grasp CNN 125. In some implementations, the image(s) 161 are applied to an initial layer of the grasp CNN 125 and the end effector motion vector 162 is applied to a downstream layer of the grasp CNN 125.

A grasp measure 177 and STN parameters 178 are generated over the grasp CNN 125 based on the applied image(s) 161 and end effector motion vector 162. In some implementations, the STN parameters may be transformation parameters for the STN 126, such as translation coefficients of an affine transform, optionally with a fixed scale for a cropped region (e.g., a fixed scale of 128.0/472.0).

The STN parameters 178 and at least one of the image(s) 161 (e.g., the current image) are applied as input to the STN 126. The STN 126 is utilized to generate a spatial transformation 179 that is a spatial transform of the applied image(s) 161 based on the STN parameters 178. In some implementations, the spatially transformed image 179 is a crop of a portion of the applied image(s) 161, where that portion is selected based on the approved STN parameters 178. In some implementations, additional and/or alternative transformations may be generated over the STN 126.

The spatial transformation 179 is applied as input to the semantic CNN 127 and semantic feature(s) 180 are generated over the semantic CNN 127 based on the applied spatially transformed image 179. For example, the semantic feature(s) 180 may indicate to which of one or more classes an object in the spatially transformed image 179 belongs such as classes of "eraser", "scissors", "comb", "shovel", "torch", "toy", "hairbrush", and/or other class(es) of greater or lesser granularity.

One or more processors of a robot may determine whether to execute the end effector motion vector 162, attempt a grasp, or execute a corrective trajectory based on the grasp measure 177 and the semantic feature(s) 180. For example, one or more desired object semantic features may be provided (e.g., via user interface input) and a grasp attempted based on the semantic feature(s) 180 indicating those semantic features and based on the grasp measure 177 and/or a grasp measure of a prior iteration satisfying one or more criteria. Additional description of implementations of utilizing a semantic grasping model is provided below with reference to FIG. 7.

Figure 3:
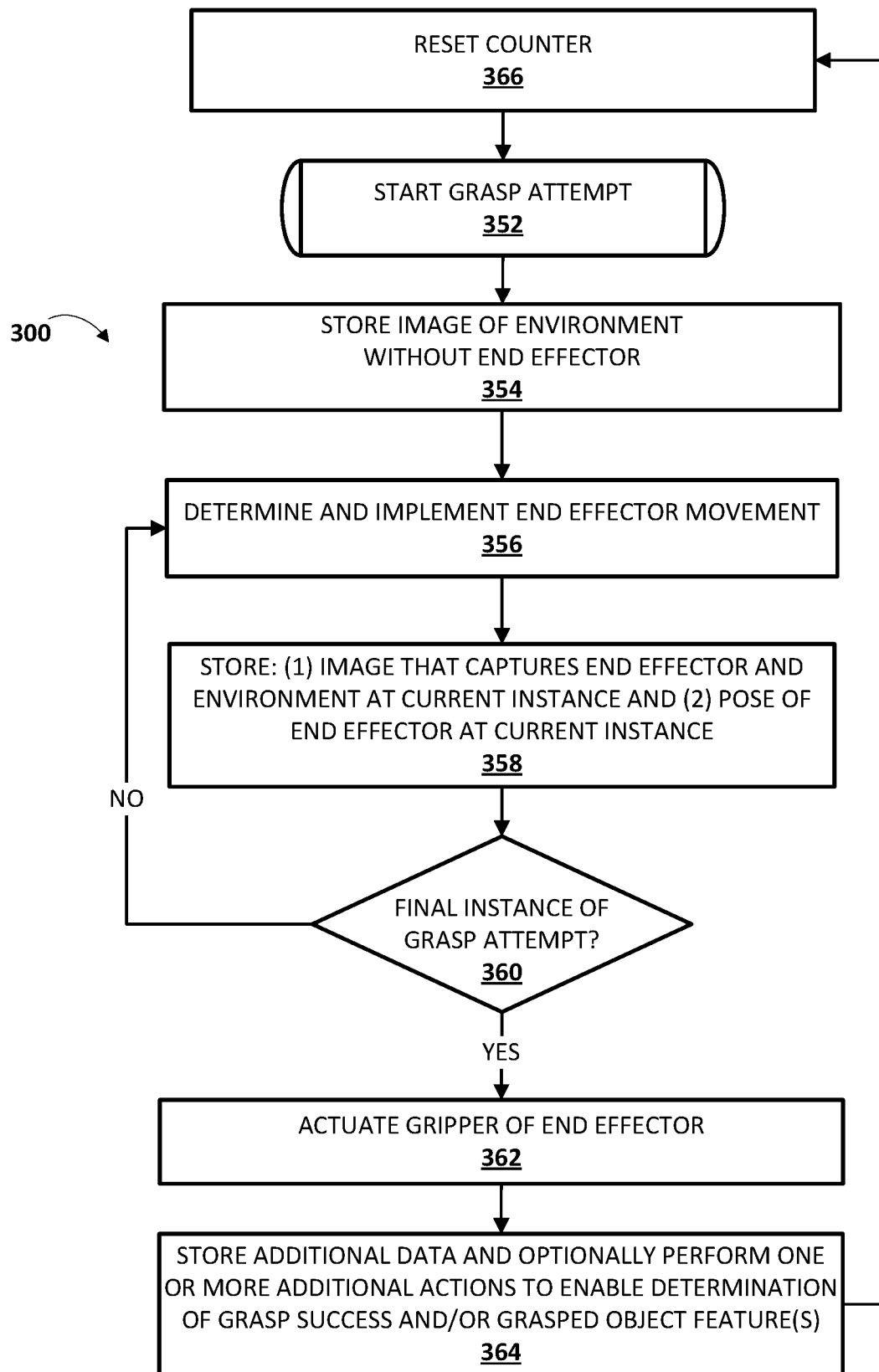
FIG. 3 is a flowchart illustrating an example method of performing grasp attempts and storing data associated with the grasp attempts.

FIG. 3 is a flowchart illustrating an example method 300 of performing grasp attempts and storing data associated with the grasp attempts. For convenience, the operations of the flow chart are described with reference to a system that performs the operations. This system may include one or more components of a robot, such as a processor and/or robot control system of robot 180A, 180B, 825, and/or other robot. Moreover, while operations of method 300 are shown in a particular order, this is not meant to be limiting. One or more operations may be reordered, omitted or added.

At block 352, the system starts a grasp attempt. At block 354, the system stores an image of an environment without an end effector present in the image. For example, the system may move the grasping end effector out of the field of view of the vision sensor (i.e., not occluding the view of the environment) and capture an image at an instance when the grasping end effector is out of the field of view. The image may then be stored and associated with the grasp attempt.

At block 356, the system determines and implements an end effector movement. For example, the system may generate one or more motion commands to cause one or more of the actuators that control the pose of the end effector to actuate, thereby changing the pose of the end effector.

In some implementations and/or iterations of block 356, the motion command(s) may be random within a given space, such as the work-space reachable by the end effector, a restricted space within which the end effector is confined for the grasp attempts, and/or a space defined by position and/or torque limits of actuator(s) that control the pose of the end effector. For example, before initial training of a neural network is completed, the motion command(s) generated by the system at block 356 to implement end effector movement may be random within a given space. Random as used herein may include truly random or pseudo-random.

In some implementations, the motion command(s) generated by the system at block 356 to implement an end effector movement may be based at least in part on a current version of a trained grasp CNN and/or based on other criteria. In some implementations, in the first iteration of block 356 for each grasp attempt, the end effector may be "out of position" based on it being moved out of the field of view at block 354. In some of those implementations, prior to the first iteration of block 356 the end effector may be randomly or otherwise moved "back into position". For example, the end effector may be moved back to a set "starting position" and/or moved to a randomly selected position within a given space.

At block 358, the system stores: (1) an image that captures the end effector and the environment at the current instance of the grasp attempt and (2) the pose of the end effector at the current instance. For example, the system may store a current image generated by a vision sensor associated with the robot and associate the image with the current instance (e.g., with a timestamp). Also, for example the system may determine the current pose of the end effector based on data from one or more joint position sensors of joints of the robot whose positions affect the pose of the robot, and the system may store that pose. The system may determine and store the pose of the end effector in task-space, joint-space, or another space.

At block 360, the system determines whether the current instance is the final instance for the grasp attempt. In some implementations, the system may increment an instance counter at block 352, 354, 356, or 358 and/or increment a temporal counter as time passes—and determine if the current instance is the final instance based on comparing a value of the counter to a threshold. For example, the counter may be a temporal counter and the threshold may be 3 seconds, 4 seconds, 5 seconds, and/or other value. In some implementations, the threshold may vary between one or more iterations of the method 300.

If the system determines at block 360 that the current instance is not the final instance for the grasping attempt, the system returns to block 356, where it determines and implements another end effector movement, then proceeds to block 358 where it stores an image and the pose at the current instance. Through multiple iterations of blocks 356, 358, and 360 for a given grasp attempt, the pose of the end effector will be altered by multiple iterations of block 356, and an image and the pose stored at each of those instances. In many implementations, blocks 356, 358, 360, and/or other blocks may be performed at a relatively high frequency, thereby storing a relatively large quantity of data for each grasp attempt.

If the system determines at block 360 that the current instance is the final instance for the grasping attempt, the system proceeds to block 362, where it actuates the gripper of the end effector. For example, for an impactive gripper end effector, the system may cause one or more plates, digits, and/or other members to close. For instance, the system may cause the members to close until they are either at a fully closed position or a torque reading measured by torque sensor(s) associated with the members satisfies a threshold.

At block 364, the system stores additional data and optionally performs one or more additional actions to enable determination of the success of the grasp of block 360 and/or to enable determination of grasped object features for an object grasped at block 360 (if any). In some implementations, the additional data stored to enable determination of success of the grasp is a position reading, a torque reading, and/or other reading from the grasping end effector. For example, a position reading that is greater than some threshold (e.g., 1 cm) following block 362 may indicate a successful grasp (e.g., may indicate that the grasping end effector is grasping some object since it can close beyond the threshold). In some implementations, the additional data stored to enable determination of grasped object features for an object grasped at block 360 is an indication of one or more object features shared by all objects available for grasp during the grasp attempt. For instance, in the grasp attempt only paintbrushes may be available in the working space of the robot and an object feature indicating a classification of "paintbrush" may be stored. The object feature(s) shared by all of the objects in a grasp attempt may be determined based on an operator provided indication and/or a sensed indication (e.g., a machine-readable code provided in the working space and captured by the vision sensor that indicates the object feature(s)).

In some implementations, at block 364 the system additionally and/or alternatively: (1) maintains the end effector in the actuated (e.g., closed) position and moves the end effector and any object that may be grasped by the end effector to a position close to a vision sensor; and (2) captures an image with the vision sensor when the end effector (and any grasped object) are in the position close to the vision sensor. In some of those implementations, the system may only move the end effector and/or capture such an image if it is first determined based on other data that a grasp is potentially successful (e.g., if a position reading indicates a successful grasp). As described herein, such a captured image may be subsequently utilized to determine if the grasp attempt was successful and/or to determine one or more grasped object features of the object grasped by the end effector. For example, the captured image may be provided to computing devices of one or more human reviewers who may utilize their computing devices to indicate, based on the captured image, whether the grasp was successful and/or to indicate one or more grasped object features of the object being grasped in the captured image. Also, for example, the captured image (or a spatial transformation thereof) may be applied to a trained semantic CNN (optionally separate from semantic CNN 127) and output generated over the trained semantic CNN to determine one or more grasped object features of the object being grasped.

At block 366, the system resets the counter (e.g., the instance counter and/or the temporal counter), and proceeds back to block 352 to start another grasp attempt.

In some implementations, the method 300 of FIG. 3 may be implemented on each of a plurality of robots, optionally operating in parallel during one or more (e.g., all) of their respective iterations of method 300. This may enable more grasp attempts to be achieved in a given time period than if only one robot was operating the method 300. Moreover, in implementations where one or more of the plurality of robots includes an associated vision sensor with a pose relative to the robot that is unique from the pose of one or more vision sensors associated with other of the robots, training examples generated based on grasp attempts from the plurality of robots may provide robustness to vision sensor pose in a neural network trained based on those training examples. Moreover, in implementations where gripping end effectors and/or other hardware components of the plurality of robots vary and/or wear differently, and/or in which different robots (e.g., same make and/or model and/or different make(s) and/or model(s)) interact with different objects (e.g., objects of different sizes, different weights, different shapes, different translucencies, different materials) and/or in different environments (e.g., different surfaces, different lighting, different environmental obstacles), training examples generated based on grasp attempts from the plurality of robots may provide robustness to various robotic and/or environmental configurations.

In some implementations, the objects that are reachable by a given robot and on which grasp attempts may be made may be different during different iterations of the method 300. For example, a human operator and/or another robot may add and/or remove objects to the workspace of a robot between one or more grasp attempts of the robot. Also, for example, the robot itself may drop one or more objects out of its workspace following successful grasps of those objects. This may increase the diversity of the training data. In some implementations, environmental factors such as lighting, surface(s), obstacles, etc. may additionally and/or alternatively be different during different iterations of the method 300, which may also increase the diversity of the training data.

Figure 4:
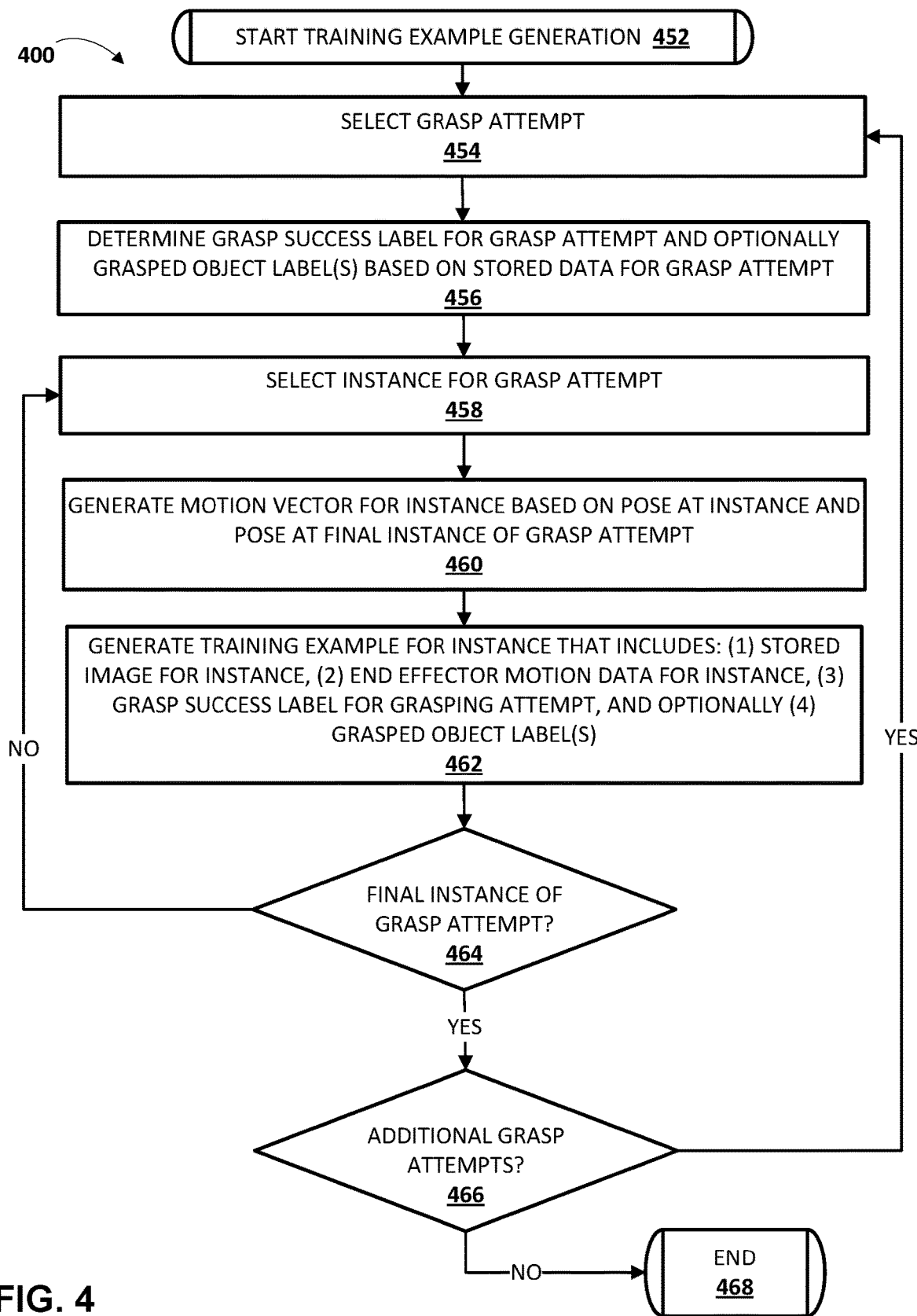
FIG. 4 is a flowchart illustrating an example method of generating training examples based on data associated with grasp attempts of robots.

FIG. 4 is a flowchart illustrating an example method 400 of generating training examples based on data associated with grasp attempts of robots. For convenience, the operations of the flow chart are described with reference to a system that performs the operations. This system may include one or more components of a robot and/or another computer system, such as a processor and/or robot control system of robot 180A, 180B, 825, and/or a processor of training example generation system 110 and/or other system that may optionally be implemented separate from a robot. Moreover, while operations of method 400 are shown in a particular order, this is not meant to be limiting. One or more operations may be reordered, omitted or added.

At block 452, the system starts training example generation. At block 454, the system selects a grasp attempt. For example, the system may access a database that includes data associated with a plurality of stored grasp attempts, and select one of the stored grasp attempts. The selected grasp attempt may be, for example, a grasp attempt generated based on the method 300 of FIG. 3.

At block 456, the system determines a grasp success label and optionally grasped object label(s) for the selected grasp attempt based on stored data for the selected grasp attempt. For example, as described with respect to block 364 of method 300, additional data may be stored for the grasp attempt to enable determination of a grasp success label and/or grasped object labels for the grasp attempt. The stored data may include data from one or more sensors, where the data is generated during and/or after the grasp attempt.

As one example, the data may be a position reading, a torque reading, and/or other reading from the gripping end effector. In such an example, the system may determine a grasp success label based on the reading(s). For example, where the reading is a position reading, the system may determine a "successful grasp" label if the reading is greater than some threshold (e.g., 1 cm)—and may determine an "unsuccessful grasp" label if the reading is less than some threshold (e.g., 1 cm).

As another example, the data may be an image of the end effector grasping an object grasped in the grasp attempt. For example, the image may be captured by a vision sensor after the end effector and any object that may be grasped by the end effector are moved to a position close to the vision sensor. In such an example, the system may utilize the captured image to determine if the grasp attempt was successful and/or to determine one or more grasped object features of the object grasped by the end effector. For example, the system may provide the captured image to computing devices of one or more human reviewers who may utilize their computing devices to indicate, based on the captured image, whether the grasp was successful and/or to indicate one or more grasped object features of the object being grasped in the captured image. As another example, the system may apply the captured image to a trained semantic CNN, generate output over the trained semantic CNN, and utilize the output to determine one or more grasped object features of the object being grasped.

As one example of grasped object labels that may be determined, the grasped object labels may indicate whether the grasped object has each of one or more of a group of classifications. For example, the grasped object labels may indicate the grasped object has a "pen" classification of the group, but does not have any other classifications of the group.

In some iterations of block 456, the system determines only a grasp success label for the grasp attempt. In some other iterations of block 456, the system additionally or alternatively determines grasped object label(s) for the grasp attempt. Whether the system determines, in a given iteration, a grasp success label and/or grasped object label(s) for the grasp attempt may be based on various factors. For example, in some iterations of block 456 only a grasp success label is determined if the grasp of the grasp attempt is unsuccessful. Also, for example, in some iterations of block 456 it may be desirable to generate training examples for training only a grasp CNN and only the grasp success label determined. Also, for example, in some iterations of block 456 it may be desirable to generate training examples for training both a grasp CNN and a semantic CNN and both the grasp success label and the grasped object label(s) determined. Also, for example, in some situations computational and/or other costs may be considered in determining if it is desirable to also generate grasp object label(s) for training examples in a given iteration.

At block 458, the system selects an instance for the grasp attempt. For example, the system may select data associated with the instance based on a timestamp and/or other demarcation associated with the data that differentiates it from other instances of the grasp attempt.

At block 460, the system generates an end effector motion vector for the instance based on the pose of the end effector at the instance and the pose of the end effector at the final instance of the grasp attempt. For example, the system may determine a transformation between the current pose and the final pose of the grasp attempt and use the transformation as the end effector motion vector. The current pose and the end effector motion vector from the current pose to the final pose of the grasp attempt may be represented in task-space, in joint-space, or in another space. For example, the end effector motion vector may be represented by five values in task-space: three values defining the three-dimensional (3D) translation vector, and two values representing a sine-cosine encoding of the change in orientation of the end effector about an axis of the end effector.

At block 462, the system generates a training example for the instance that includes: (1) the stored image for the instance, (2) the end effector motion vector generated for the instance at block 460, and (3) the grasp success label and/or the grasped object label(s) determined at block 456. In some implementations, the system generates a training example that also includes a stored additional image for the grasping attempt, such as one that at least partially omits the end effector and that was captured before the grasp attempt. In some of those implementations, the system concatenates the stored image for the instance and the stored additional image for the grasping attempt to generate a concatenated image for the training example. The concatenated image includes both the stored image for the instance and the stored additional image. For example, where both images include X by Y pixels and three channels (e.g., red, blue, green), the concatenated image may include X by Y pixels and six channels (three from each image). As described herein, the current image, the additional image, and the vector from the current pose to the final pose of the grasp attempt of the training examples may be utilized as training example input(s); and the grasp success label and/or the grasped object label(s) may be utilized as training example output(s).

In some implementations, at block 462 the system may optionally process the image(s). For example, the system may optionally resize the image to fit a defined size of an input layer of one or more networks, remove one or more channels from the image, and/or normalize the values for depth channel(s) (in implementations where the images include a depth channel).

At block 464, the system determines whether the selected instance is the final instance of the grasp attempt. If the system determines the selected instance is not the final instance of the grasp attempt, the system returns to block 458 and selects another instance.

If the system determines the selected instance is the final instance of the grasp attempt, the system proceeds to block 466 and determines whether there are additional grasp attempts to process. If the system determines there are additional grasp attempts to process, the system returns to block 454 and selects another grasp attempt. In some implementations, determining whether there are additional grasp attempts to process may include determining whether there are any remaining unprocessed grasp attempts. In some implementations, determining whether there are additional grasp attempts to process may additionally and/or alternatively include determining whether a threshold number of training examples has already been generated and/or other criteria has been satisfied.

If the system determines there are not additional grasp attempts to process, the system proceeds to block 466 and the method 400 ends. Another iteration of method 400 may be performed again. For example, the method 400 may be performed again in response to at least a threshold number of additional grasp attempts being performed.

Although method 300 and method 400 are illustrated in separate figures herein for the sake of clarity, it is understood that one or more blocks of method 400 may be performed by the same component(s) that perform one or more blocks of the method 300. For example, one or more (e.g., all) of the blocks of method 300 and the method 400 may be performed by processor(s) of a robot. Also, it is understood that one or more blocks of method 400 may be performed in combination with, or preceding or following, one or more blocks of method 300.

Figure 5:
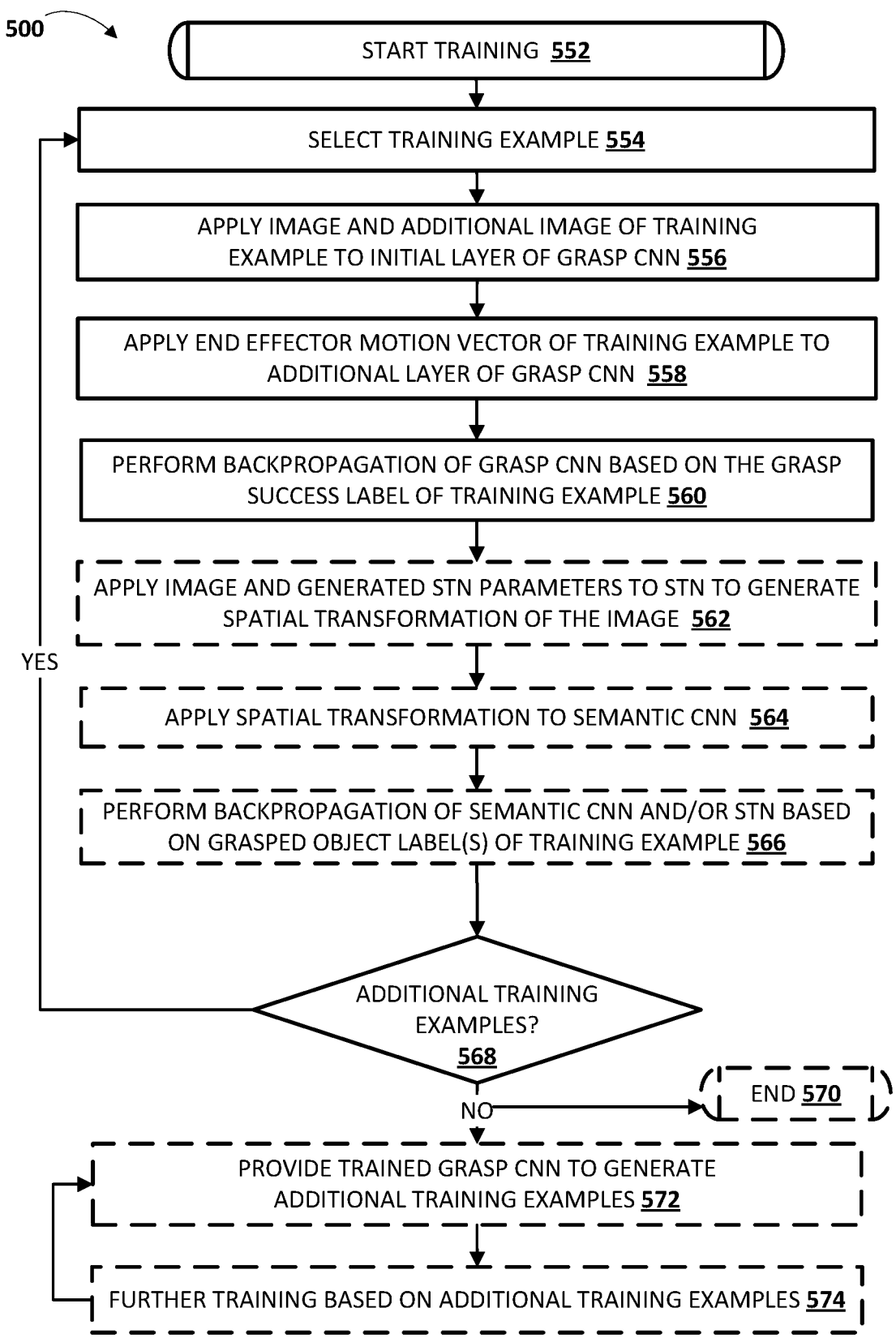
FIG. 5 is a flow chart illustrating an example method of training one or more networks of a semantic grasping model based on training examples.

FIG. 5 is a flowchart illustrating an example method 500 of training one or more networks of a semantic grasping model based on training examples. For convenience, the operations of the flow chart are described with reference to a system that performs the operations. This system may include one or more components of a computer system, such as a processor (e.g., a GPU) of training engine 120 and/or other computer system operating over the networks 125, 126, and 127 of semantic grasping model 124. Moreover, while operations of method 500 are shown in a particular order, this is not meant to be limiting. One or more operations may be reordered, omitted or added.

At block 552, the system starts training. At block 554, the system selects a training example. For example, the system may select a training example generated based on the method 400 of FIG. 4.

At block 556, the system applies an image for the instance of the training example and an additional image of the selected training example to an initial layer of a grasp CNN. For example, the system may apply the images to an initial convolutional layer of the grasp CNN. As described herein, the additional image may at least partially omit the end effector. In some implementations, the system concatenates the image and the additional image and applies the concatenated image to the initial layer. In some other implementations, the image and the additional image are already concatenated in the training example.

At block 558, the system applies the end effector motion vector of the selected training example to an additional layer of the grasp CNN. For example, the system may apply the end effector motion vector to an additional layer of the grasp CNN that is downstream of the initial layer to which the images are applied at block 556. In some implementations, to apply the end effector motion vector to the additional layer, the system passes the end effector motion vector through a fully connected layer to generate end effector motion vector output, and concatenates the end effector motion vector output with output from an immediately upstream layer of the grasp CNN. The immediately upstream layer is immediately upstream of the additional layer to which the end effector motion vector is applied and may optionally be one or more layers downstream from the initial layer to which the images are applied at block 556. In some implementations, the initial layer is a convolutional layer, the immediately upstream layer is a pooling layer, and the additional layer is a convolutional layer.

At block 560, the system performs backpropagation on one or more layers of the grasp CNN based on the grasp success label of the training example. For example, the system may generate, over the grasp CNN based on the applying of block 558, a predicted measure of successful grasp, determine an error based on comparison of the predicted measure of successful grasp to the grasp success label of the training example, and backpropagate the error through one or more layers of the grasp CNN.

Blocks 562, 564, and 566 are now described. Those blocks are indicated in dashed lines in FIG. 5 since they may not be performed in all iterations of method 500. For example, in some iterations of method 500 only the grasp CNN may be trained and may be trained in those iterations based on performance of blocks 554, 556, 558, and 560 (without performance of blocks 562, 564, 566). For example, some training examples selected at block 554 may not include grasped object labels and, as a result, training of a grasp CNN may be performed based on those training examples without performance of blocks 562, 564, and 566 based on those training examples.

At block 562, the system applies the image of the training example and STN parameters to a STN to generate a spatial transformation of the image. The STN parameters are generated over the grasp CNN by the system based on the applying of block 558. For example, based on the applying of block 558, the predicted measure of successful grasp and the STN parameters may both be generated.

At block 564, the system applies the spatial transformation generated at block 562 to a semantic CNN.

At block 566, the system performs backpropagation of the semantic CNN and/or the STN based on the grasped object label(s) of the training example. For example, the system may generate, over the semantic CNN based on the applying of block 564, predicted semantic object feature(s) of object(s) present in the spatially transformed image, determine an error based on comparison of the predicted semantic object feature(s) and the grasped object label(s) of the training example, and backpropagate the error through one or more layers of the semantic CNN. In some implementations, the error may further be backpropagated through the STN parameter layer(s) of the grasp CNN (but optionally not through any other layers of the grasp CNN). Backpropagation of the STN and/or the STN parameter layer(s) may enable, over multiple iterations during training, the STN parameters and/or the STN to adapt to cause spatially transformed images to be generated that are of a location/area to be grasped.

At block 568, the system determines whether there are additional training examples. If the system determines there are additional training examples, the system returns to block 554 and selects another training example. In some implementations, determining whether there are additional training examples may include determining whether there are any remaining training examples that have not been utilized to train one or more networks of the semantic grasping model. In some implementations, determining whether there are additional training examples may additionally and/or alternatively include determining whether a threshold number of training examples have been utilized and/or other criteria has been satisfied.

If the system determines there are not additional training examples and/or that some other criteria has been met, the system proceeds to block 570 or block 572.

At block 572, the training of the semantic grasping model may end. The semantic grasping model may then be provided for use by one or more robots in servoing a grasping end effector to achieve a successful grasp of an object by the grasping end effector. For example, a robot may utilize the semantic grasping model in performing the method 700 of FIG. 7.

At block 572, the system may additionally and/or alternatively provide the trained grasp CNN to generate additional training examples based on the trained grasp CNN. For example, one or more robots may utilize the trained grasp CNN in performing grasp attempts and data from those grasp attempts utilized to generate additional training examples. For instance, one or more robots may utilize the trained grasp CNN in performing grasp attempts based on some blocks of the method 700 of FIG. 7 and data from those grasp attempts utilized to generate additional training examples based on the method 400 of FIG. 4. The robots whose data is utilized to generate additional training examples may be robots in a laboratory/training set up and/or robots in actual use by one or more consumers.

At block 574, the system may perform further training of one or more networks of the semantic grasping model based on the additional training examples generated in response to providing the trained grasp CNN at block 572. For example, the system may perform additional iterations of blocks 554, 556, 558, and 560 (and optionally blocks 562, 564, and 566) based on additional training examples.

As indicated by the arrow extending from block 574 to block 572, the updated grasp CNN may be provided again at block 572 to generate further training examples and those training examples utilized at block 574 to further train one or more networks of the semantic grasping model. In some implementations, grasp attempts performed in association with future iterations of block 572 may be temporally longer grasp attempts than those performed in earlier iterations and/or those performed without utilization of a trained grasp CNN. For example, implementations of method 300 of FIG. 3 that are performed without utilization of a trained grasp CNN may have the temporally shortest grasp attempts, those performed with an initially trained grasp CNN may have temporally longer grasp attempts, those performed with the next iteration of a trained grasp CNN yet temporally longer grasp attempts, etc. This may optionally be implemented via the optional instance counter and/or temporal counter of method 300.

Figure 6A:
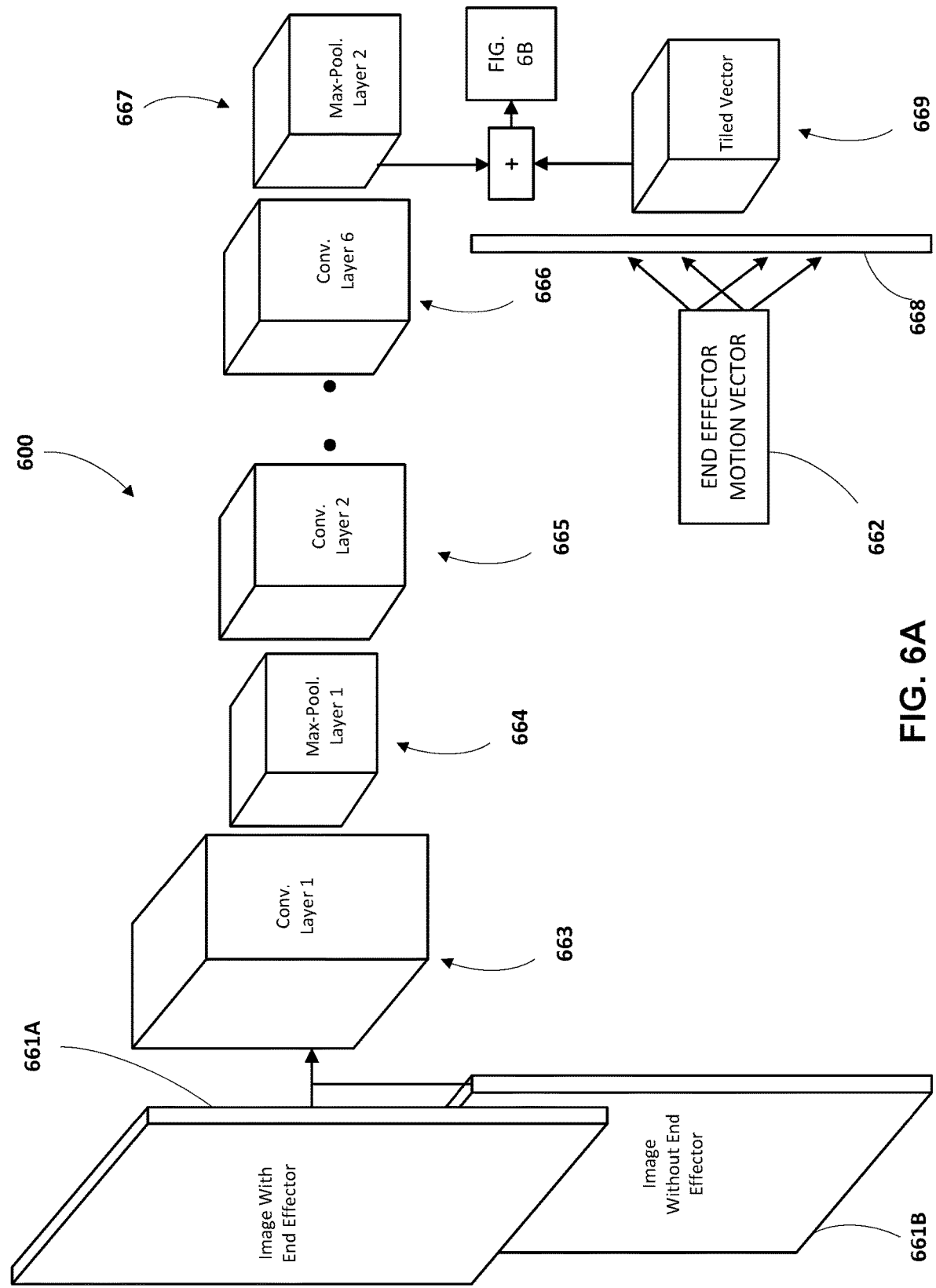
FIGS. 6A and 6B illustrate an architecture of an example grasp convolutional neural network, example inputs that may be applied to the grasp convolutional neural network, and example outputs that may be generated over the grasp convolutional neural network.
Figure 6B:
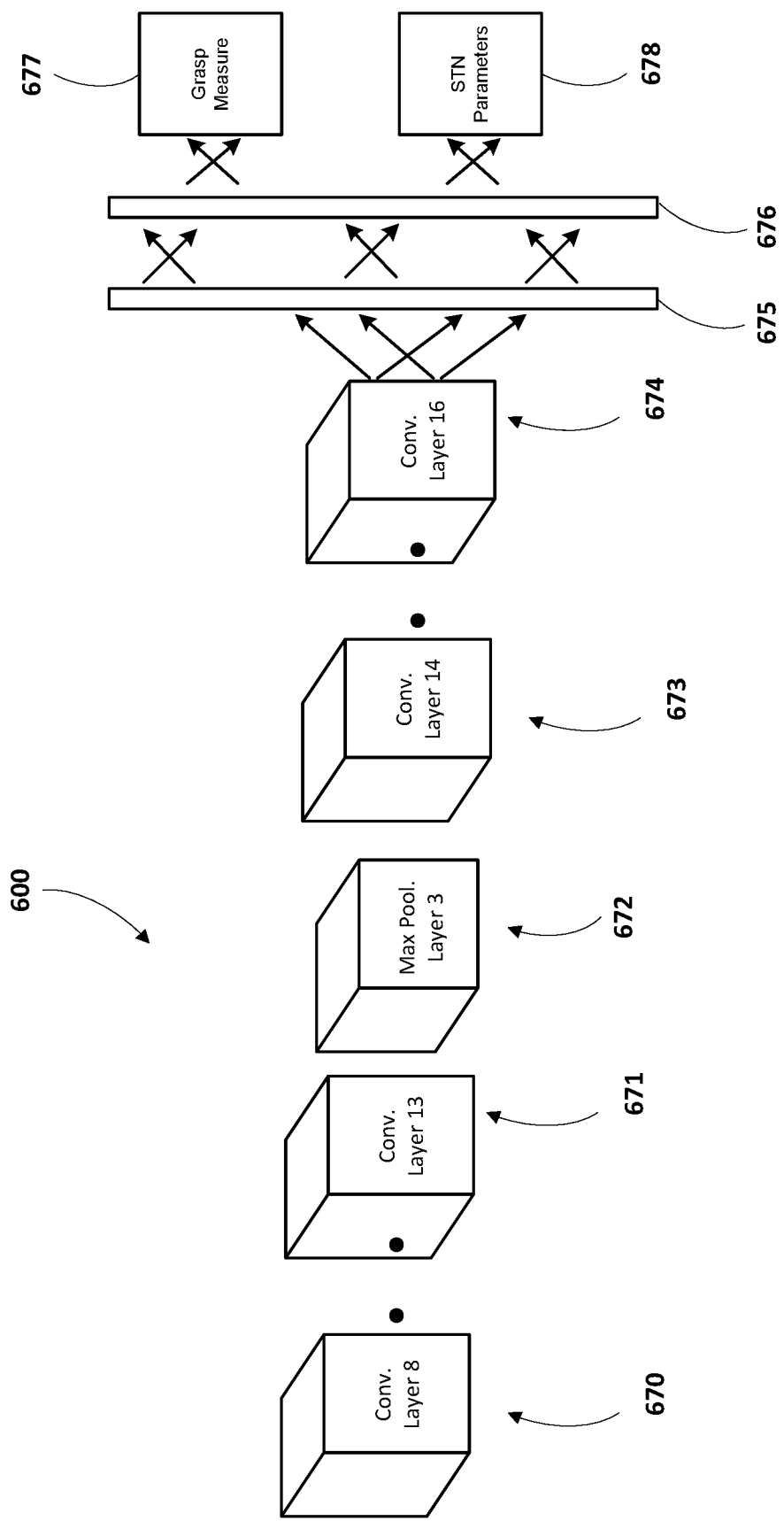

FIGS. 6A and 6B illustrate an example architecture of a grasp CNN 600 of various implementations. The grasp CNN 600 of FIGS. 6A and 6B is an example of a grasp CNN that may be trained based on the method 500 of FIG. 5. The grasp CNN 600 of FIGS. 6A and 6B is further an example of a grasp CNN that, once trained, may be utilized in servoing a grasping end effector based on the method 700 of FIG. 7. Generally, a convolutional neural network is a multilayer learning framework that includes an input layer, one or more convolutional layers, optional weight and/or other layers, and an output layer. During training, a convolutional neural network is trained to learn a hierarchy of feature representations. Convolutional layers of the network are convolved with filters and optionally down-sampled by pooling layers. Generally, the pooling layers aggregate values in a smaller region by one or more downsampling functions such as max, min, and/or normalization sampling.

The grasp CNN 600 includes an initial input layer 663 that is a convolutional layer. In some implementations, the initial input layer 663 is a 6×6 convolutional layer with stride 2, and 64 filters. Image with an end effector 661A and image without an end effector 661B are also illustrated in FIG. 6A. The images 661A and 661B are further illustrated being concatenated (represented by the merging lines extending from each) and the concatenated image being fed to the initial input layer 663. In some implementations, the images 661A and 661B may each be 472 pixels, by 472 pixels, by 3 channels (e.g., the 3 channels may be selected from depth channel, first color channel, second color channel, third color channel). Accordingly, the concatenated image may be 472 pixels, by 472 pixels, by 6 channels. Other sizes may be used such as different pixel sizes or more or fewer channels. The images 661A and 661B are convolved to the initial input layer 663. The weights of the features of the initial input layer and other layers of grasp CNN 600 are learned during training of the grasp CNN 600 based on multiple training examples.

The initial input layer 663 is followed by a max-pooling layer 664. In some implementations, the max-pooling layer 664 is a 3×3 max pooling layer with 64 filters. The max-pooling layer 664 is followed by six convolutional layers, two of which are represented in FIG. 6A by 665 and 666. In some implementations, the six convolutional layers are each 5×5 convolutional layers with 64 filters. The convolutional layer 666 is followed by a max pool layer 667. In some implementations, the max-pooling layer 667 is a 3×3 max pooling layer with 64 filters.

An end effector motion vector 662 is also illustrated in FIG. 6A. The end effector motion vector 662 is concatenated with the output of max-pooling layer 667 (as indicated by the "+" of FIG. 6A) and the concatenated output applied to a convolutional layer 670 (FIG. 6B). In some implementations, concatenating the end effector motion vector 662 with the output of max-pooling layer 667 includes processing the end effector motion vector 662 by a fully connected layer 668, whose output is then pointwise added to each point in the response map of max-pooling layer 667 by tiling the output over the spatial dimensions via a tiled vector 669. In other words, end effector motion vector 662 is passed through fully connected layer 668 and replicated, via tiled vector 669, over the spatial dimensions of the response map of max-pooling layer 667.

Turning now to FIG. 6B, the concatenation of end effector motion vector 662 and the output of max-pooling layer 667 is provided to convolutional layer 670, which is followed by five more convolutional layers (the last convolutional layer 671 of those five is illustrated in FIG. 6B, but the intervening four are not). In some implementations, the convolutional layers 670 and 671, and the four intervening convolutional layers are each 3×3 convolutional layers with 64 filters.

The convolutional layer 671 is followed by a max-pooling layer 672. In some implementations, the max-pooling layer 672 is a 2×2 max pooling layer with 64 filters. The max-pooling layer 672 is followed by three convolutional layers, two of which are represented in FIG. 6A by 673 and 674.

The final convolutional layer 674 of the grasp CNN 600 is fully connected to a first fully connected layer 675 which, in turn, is fully connected to a second fully connected layer 676. The fully connected layers 675 and 676 may be vectors, such as vectors of size 64. The output of the second fully connected layer 676 is utilized to generate the measure 677 of a successful grasp. For example, a sigmoid may be utilized to generate and output the measure 677.

The output of the second fully connected layer 676 is also utilized to generate the STN parameters 678. For example, a sigmoid may be utilized to generate and output the STN parameters 678. In some implementations, separate fully connected layer(s) may be fully connected to the final convolutional layer 674 and those fully connected layer(s) may be STN layer(s) utilized to generate the STN parameters 678 (while the separate fully connected layers 675 and 676 are separately utilized to generate the measure 677 of a successful grasp).

Figure 6C:
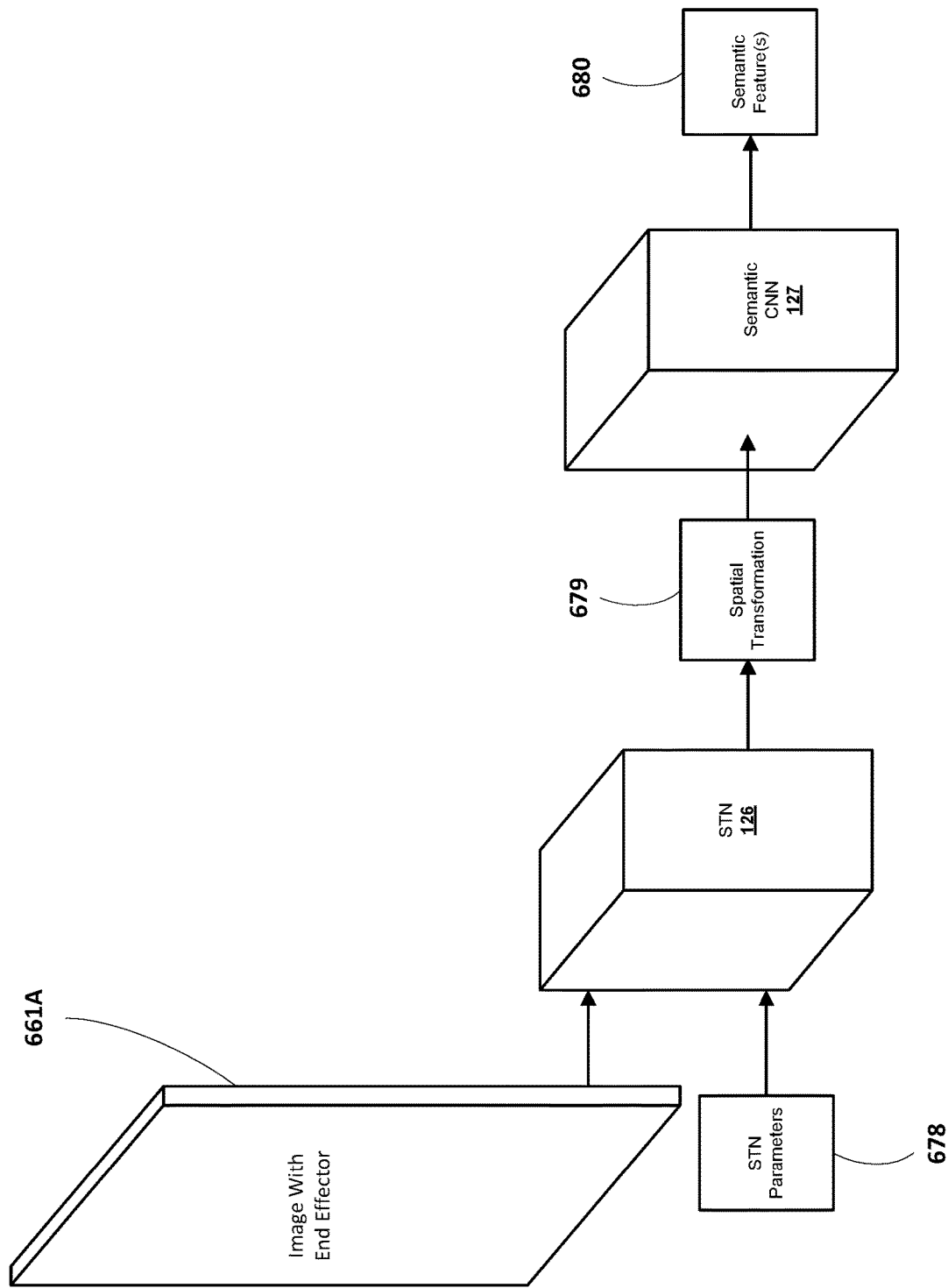
FIG. 6C illustrates a spatial transformer network and semantic convolutional neural network, example inputs that may be applied to the networks, and example outputs that may be generated over the networks.

FIG. 6C illustrates a spatial transformer network 126 and semantic convolutional neural network 127, example inputs that may be applied to the networks, and example outputs that may be generated over the networks. Although not explicitly illustrated, it is understood that in many implementations STN 126 and semantic CNN 127 will each have a plurality of layers, such as convolutional layers, pooling layers, and/or other layers.

In FIG. 6C, the STN parameters 678 generated based on the grasp CNN 600 of FIGS. 6A and 6B are applied as input to the STN 126. Further, the image with an end effector 661A is also applied as input to the STN 126. A spatial transformation 679 is generated over the STN 126 based on the applied STN parameters 678 and image 661A.

The spatial transformation 679 is applied as input to the semantic CNN 127. Semantic feature(s) 680 are generated based on output generated over the semantic CNN 127 based on application of the transformed image 679. For example, the output of the semantic CNN 127 may be a vector with N values, with each of the values indicating whether an object of the transformed image 679 has a classification corresponding to the value.

In some implementations of training the grasp CNN 600, the STN 126, and/or semantic CNN 127, various values for epochs, learning rate, weight decay, dropout probability, and/or other parameters may be utilized. In some implementations, one or more GPUs may be utilized for training and/or utilizing the grasp CNN 600, the STN 126, and/or semantic CNN 127. Although particular architectures and arrangements of the grasp CNN 600, the STN 126, and the semantic CNN 127 are illustrated in FIGS. 6A, 6B, and 6C variations are possible. For example, more or fewer convolutional layers may be provided in the grasp CNN 600, one or more layers of the grasp CNN 600 may be different sizes than those provided as examples, etc.

Figure 7:
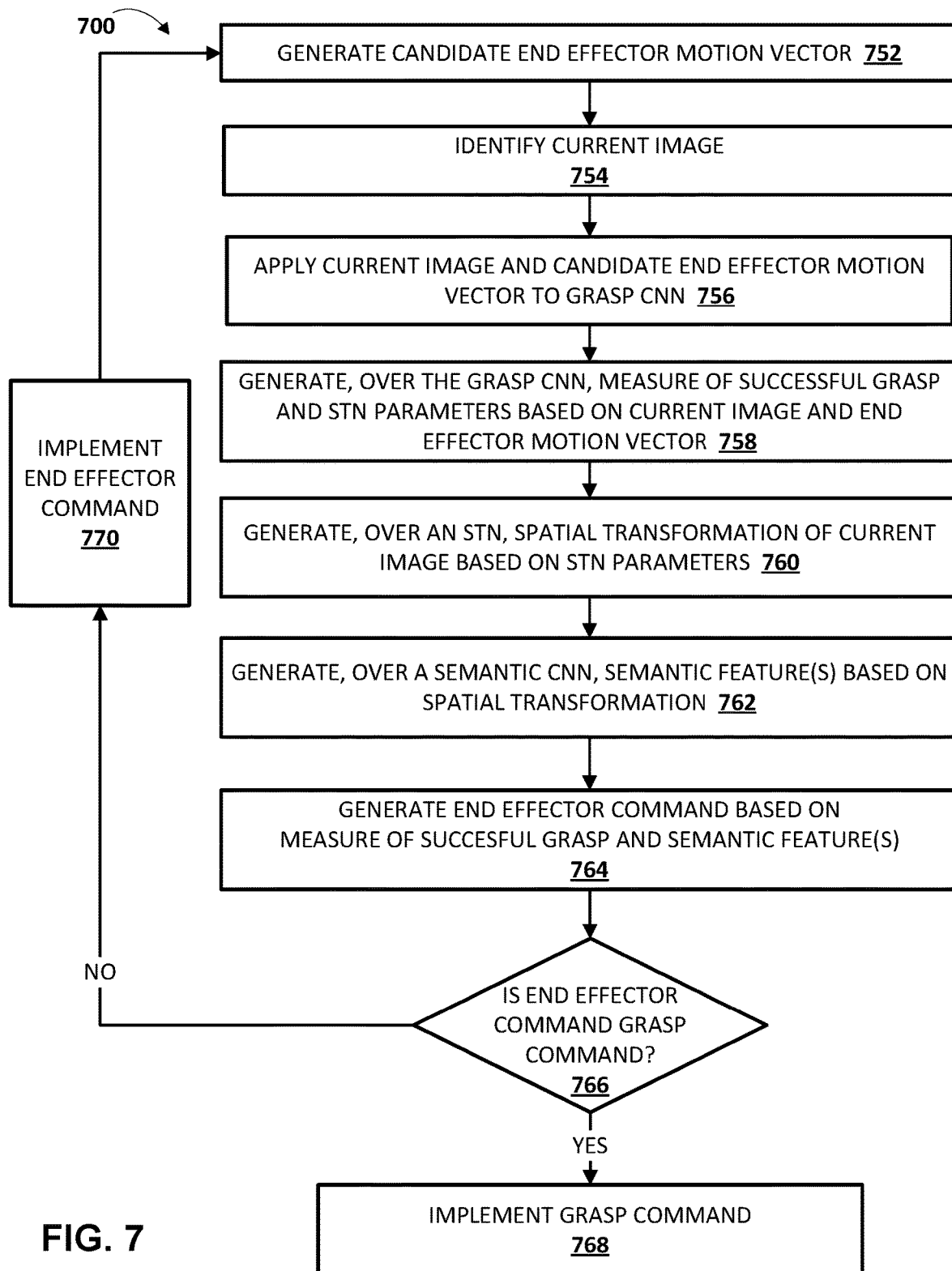
FIG. 7 is a flowchart illustrating an example method of utilizing a semantic grasping model to servo a grasping end effector.

Once a semantic grasping model is trained according to techniques described herein, it may be utilized to servo a grasping end effector. With reference to FIG. 7, a flowchart illustrating an example method 700 of utilizing a semantic grasping model to servo a grasping end effector is illustrated. For convenience, the operations of the flow chart are described with reference to a system that performs the operations. This system may include one or more components of a robot, such as a processor (e.g., CPU and/or GPU) and/or robot control system of robot 180A, 180B, 825, and/or other robot. In implementing one or more blocks of method 700, the system may operate over a trained semantic grasping model which may, for example, be stored locally at a robot and/or may be stored remote from the robot. Moreover, while operations of method 700 are shown in a particular order, this is not meant to be limiting. One or more operations may be reordered, omitted or added.

At block 752, the system generates a candidate end effector motion vector. The candidate end effector motion vector may be defined in task-space, joint-space, or other space, depending on the input parameters of the trained CNN to be utilized in further blocks.

In some implementations, the system generates a candidate end effector motion vector that is random within a given space, such as the work-space reachable by the end effector, a restricted space within which the end effector is confined for the grasp attempts, and/or a space defined by position and/or torque limits of actuator(s) that control the pose of the end effector.

In some implementations the system may utilize one or more techniques to sample a group of candidate end effector motion vectors and to select a subgroup from the sampled group. For example, the system may utilize an optimization technique, such as the cross-entropy method (CEM). CEM is a derivative-free optimization algorithm that samples a batch of N values at each iteration, fits a Gaussian distribution to M<N of these samples, and then samples a new batch of N from this Gaussian. For instance, the system may utilize CEM and values of M=64 and N=6, and perform three iterations of CEM to determine a best available (according to the CEM) candidate end effector motion vector.

In some implementations, one or more constraints may be imposed on the candidate end effector motion vector that can be generated at block 752. For example, the candidate end effector motions evaluated by CEM or other technique may be constrained based on the constraints. One example of constraints are computer generated and/or human inputted constraints (e.g., via a user interface input device of a computer system) that imposes constraints on area(s) in which grasps may be attempted, constraints on particular object feature(s) on which grasps may be attempted, etc. Yet other examples of constraints include, for example, constraints based on a workspace of the robot, joint limits of the robot, torque limits of the robot, constraints provided by a collision avoidance system and that restrict the movement of the robot to prevent collision with one or more objects, etc.

At block 754, the system identifies a current image that captures the end effector and one or more environmental objects. In some implementations, the system also identifies an additional image that at least partially omits the end effector, such as an additional image of the environmental objects that was captured by a vision sensor when the end effector was at least partially out of view of the vision sensor. In some implementations, the system concatenates the image and the additional image to generate a concatenated image. In some implementations, the system optionally performs processing of the image(s) and/or concatenated image (e.g., to size to an input of the grasp CNN).

At block 756, the system applies the current image and the candidate end effector motion vector to a trained grasp CNN. For example, the system may apply the concatenated image, that includes the current image and the additional image, to an initial layer of the trained grasp CNN. The system may also apply the candidate end effector motion vector to an additional layer of the trained grasp CNN that is downstream of the initial layer. In some implementations, in applying the candidate end effector motion vector to the additional layer, the system passes the end effector motion vector through a fully connected layer of the grasp CNN to generate end effector motion vector output and concatenates the end effector motion vector output with upstream output of the grasp CNN. The upstream output is from an immediately upstream layer of the grasp CNN that is immediately upstream of the additional layer and that is downstream from the initial layer and from one or more intermediary layers of the grasp CNN.

At block 758, the system generates, over the trained grasp CNN, a measure of a successful grasp and STN parameters. The measure and the STN parameters are generated based on the applying of the current image (and optionally the additional image) and the candidate end effector motion vector to the trained grasp CNN at block 756 and determining the measure and the STN parameters based on the learned weights of the trained grasp CNN.

At block 760, the system generates, over an STN, a spatial transformation of the current image of block 754 based on the STN parameters of block 758.

At block 762, the system generates, over a semantic CNN, semantic feature(s) based on the spatial transformation of block 760.

At block 764, the system generates an end effector command based on the measure of a successful grasp of block 758 and the semantic feature(s) of block 762. Generally, at block 764, the system generates an end effector command that seeks to achieve (through one or more iterations of method 700) a successful grasp that is of an object that has desired object semantic features. The desired object semantic features may be based on, for example, user interface input provided to the system and/or input from one or more separate components. As one example, if the measure of successful grasp of block 758 satisfies a threshold that indicates a successful grasp and the semantic feature(s) of block 762 indicate the desired semantic object feature(s), the end effector command may generate an end effector command that corresponds to the end effector motion vector of block 752 (then a grasp optionally performed).

In some implementations multiple candidate end effector motion vectors are considered in a given iteration of method 700 and a measure of successful grasp and semantic feature(s) determined for each of the candidate end effector motion vectors (all based on the same current image). In some of those implementations, at block 764 the system determines the end effector motion vector with a determined corresponding measure of successful grasp that is most indicative of success and with determined corresponding semantic feature(s) that conform to the desired semantic object feature(s), and generates an end effector command that corresponds to that end effector motion vector.

As one example of those implementations, the system may generate one or more additional candidate end effector motion vectors at block 752, and generate: measures of successful grasps for those additional candidate end effector motion vectors at additional iterations of block 758 (based on applying the current image and the additional candidate end effector motion vectors to the grasp CNN); and semantic feature(s) for those additional candidate end effector motion vectors at additional iterations of block 762. The additional iterations of blocks 758 and 762 may optionally be performed in parallel by the system. In some of those implementations, the system may generate the end effector command at block 764 based on analysis of all generated measures of successful grasp and corresponding semantic feature(s). For example, the system may generate the end effector command to fully or substantially conform to the candidate end effector motion vector with: the measure of successful grasp that is most indicative of a successful grasp; and corresponding semantic feature(s) that match the desired object semantic feature(s). For example, a control system of a robot of the system may generate motion command(s) to actuate one or more actuators of the robot to move the end effector based on the end effector motion vector.

In some iterations of block 764, the system additionally and/or alternatively generates the end effector command based on a current measure of successful grasp and current semantic feature(s) if no candidate end effector motion vector is utilized to generate new motion commands. For example, if one or more comparisons of the current measure of successful grasp to the measure of successful grasp determined at block 758 fail to satisfy a threshold, and the current semantic feature(s) indicate the desired object semantic features, then the end effector motion command may be a "grasp command" that causes the end effector to attempt a grasp (e.g., close digits of an impactive gripping end effector). For instance, if the result of the current measure of successful grasp divided by the measure of successful grasp determined at block 758 for the candidate end effector motion vector that is most indicative of successful grasp is greater than or equal to a first threshold (e.g., 0.9), the end effector command may be a grasp command (under the rationale of stopping the grasp early if closing the gripper is nearly as likely to produce a successful grasp as moving it). Also, for instance, if the result is less than or equal to a second threshold (e.g., 0.5), the end effector command may be a motion command to effectuate a trajectory correction (e.g., raise the gripping end effector "up" by at least X meters) (under the rationale that the gripping end effector is most likely not positioned in a good configuration and a relatively large motion is required). Also, for instance, if the result is between the first and second thresholds, a motion command may be generated that substantially or fully conforms to the candidate end effector motion vector with the measure of successful grasp determined at block 758 that is most indicative of successful grasp and that also includes corresponding sematic feature(s) that correspond to the desired object semantic feature(s). The end effector command generated by the system may be a single group of one or more commands, or a sequence of groups of one or more commands.

The measure of successful grasp if no candidate end effector motion vector is utilized to generate new motion commands may be based on the measure for the candidate end effector motion vector utilized in a previous iteration of the method 700 and/or based on applying a "null" motion vector and the current image (and optionally the additional image) to the trained grasp CNN at an additional iteration of block 758, and generating the measure based on an additional iteration of block 758.

At block 762, the system determines whether the end effector command is a grasp command. If the system determines at block 762 that the end effector command is a grasp command, the system proceeds to block 764 and implements the grasp command. In some implementations, the system may optionally determine whether the grasp command results in a successful grasp (e.g., using techniques described herein) and, if not successful, the system may optionally adjust the pose of the end effector and return to block 752. Even where the grasp is successful, the system may return to block 752 at a later time to grasp another object.

If the system determines at block 762 that the end effector command is not a grasp command (e.g., it is a motion command), the system proceeds to block 766 and implements the end effector command, then returns to blocks 752, where it generates another candidate end effector motion vector. For example, at block 766 the system may implement an end effector motion command that substantially or fully conforms to the candidate end effector motion vector with the grasp measure that is most indicative of successful grasp and that also includes semantic feature(s) that conform to the desired object semantic feature(s).

In many implementations, blocks of method 700 may be performed at a relatively high frequency, thereby enabling iterative updating of end effector commands and enabling servoing of the end effector along a trajectory that is informed by the trained CNN to lead to a relatively high probability of successful grasp of an object having the desired object feature(s).

Figure 8:
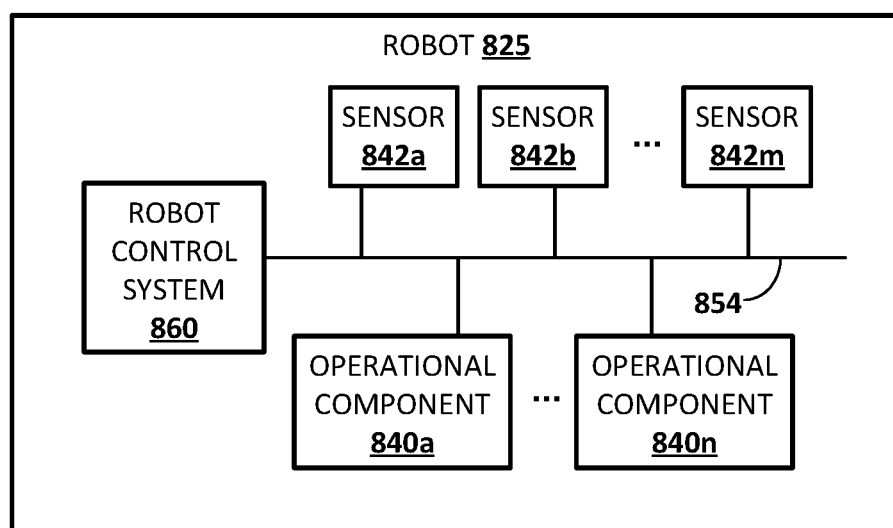
FIG. 8 schematically depicts an example architecture of a robot.

FIG. 8 schematically depicts an example architecture of a robot 825. The robot 825 includes a robot control system 860, one or more operational components 825a-825n, and one or more sensors 842a-842m. The sensors 842a-842m may include, for example, vision sensors, light sensors, pressure sensors, pressure wave sensors (e.g., microphones), proximity sensors, accelerometers, gyroscopes, thermometers, barometers, and so forth. While sensors 842a-m are depicted as being integral with robot 825, this is not meant to be limiting. In some implementations, sensors 842a-m may be located external to robot 825, e.g., as standalone units.

Operational components 825a-825n may include, for example, one or more end effectors and/or one or more servo motors or other actuators to effectuate movement of one or more components of the robot. For example, the robot 825 may have multiple degrees of freedom and each of the actuators may control actuation of the robot 825 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 860 may be implemented in one or more processors, such as a CPU, GPU, and/or other controller(s) of the robot 825. In some implementations, the robot 825 may comprise a "brain box" that may include all or aspects of the control system 860. For example, the brain box may provide real time bursts of data to the operational components 825*a-n*, with each of the real time bursts comprising a set of one or more control commands that dictate, inter alia, the parameters of motion (if any) for each of one or more of the operational components 825*a-n*. In some implementations, the robot control system 860 may perform one or more aspects of methods 300, 400, 500, and/or 700 described herein.

As described herein, in some implementations all or aspects of the control commands generated by control system 860 in positioning an end effector to grasp an object may be based on end effector commands generated based on utilization of semantic grasping model. For example, a vision sensor of the sensors 842*a-m* may capture a current image and an additional image, and the robot control system 860 may generate a candidate motion vector. The robot control system 860 may provide the current image, the additional image, and the candidate motion vector to a trained semantic grasping model and utilize a measure of successful grasp and semantic feature(s) generated based on the applying to generate one or more end effector control commands for controlling the movement and/or grasping of an end effector of the robot. Although control system 860 is illustrated in FIG. 8 as an integral part of the robot 825, in some implementations, all or aspects of the control system 860 may be implemented in a component that is separate from, but in communication with, robot 825. For example, all or aspects of control system 860 may be implemented on one or more computing devices that are in wired and/or wireless communication with the robot 825, such as computing device 910.

Figure 9:
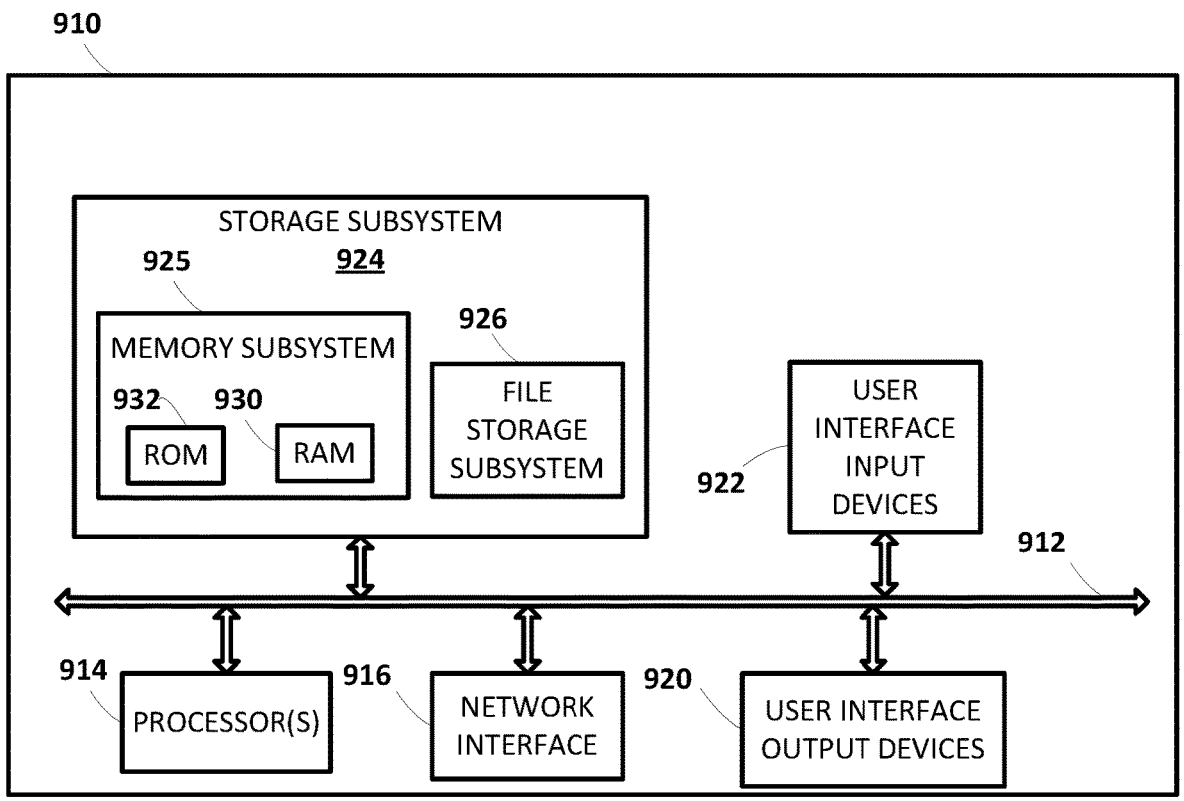
FIG. 9 schematically depicts an example architecture of a computer system.

FIG. 9 is a block diagram of an example computing device 910 that may optionally be utilized to perform one or more aspects of techniques described herein. For example, in some implementations computing device 910 may be utilized to provide desired object semantic feature(s) for grasping by robot 825 and/or other robots. Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the method of FIGS. 3, 4, 5, and/or 7.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. I$_t$ is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
identifying, by one or more processors, a plurality of training examples generated based on sensor output from one or more robots during a plurality of grasp attempts by the robots,
each of the training examples including training example input comprising:
an image for a corresponding instance of time of a corresponding grasp attempt of the grasp attempts, the image capturing a robotic end effector and one or more environmental objects at the corresponding instance of time,
an end effector motion vector defining motion of the end effector to move from an instance of time pose of the end effector at the corresponding instance of time to a final pose of the end effector for the corresponding grasp attempt, and
each of the training examples including training example output comprising:
at least one grasped object label indicating a semantic feature of an object grasped by the corresponding grasp attempt; and
training, by one or more of the processors, a convolutional neural network based on the training examples, wherein training the convolutional neural network based on the training examples comprises performing instances of backpropagation, on the convolutional neural network, that are based on the training examples.

2. The method of claim 1, wherein training the convolutional neural network based on the training examples comprises:
applying, to an additional convolutional neural network, the training example input of a given training example of the training examples;
generating, over the additional convolutional neural network based on the training example input of the given training example, spatial transformer network parameters;
using the spatial transformer network parameters to generate a spatial transformation of the image of the given training example;
generating output over the convolutional neural network based on the spatial transformation of the image; and
updating the convolutional neural network based on the output and the training example output of the given training example.

3. The method of claim 1, further comprising:
training the convolutional neural network based on additional training examples that are not generated based on grasp attempts.

4. The method of claim 1, further comprising:
training an additional convolutional neural network based on the training examples.

5. The method of claim 4, wherein training the additional convolutional neural network based on the training examples comprises:
generating, over the additional convolutional neural network based on applying the training example input of the given training example to the additional convolutional neural network, a predicted grasp measure; and
updating the additional convolutional neural network based on the predicted grasp measure and the training example output of the given training example.

6. The method of claim 1, wherein the training examples comprise:
a first group of the training examples generated based on output from a plurality of first robot sensors of a first robot during a plurality of the grasp attempts by the first robot; and
a second group of the training examples generated based on output from a plurality of second robot sensors of a second robot during a plurality of the grasp attempts by the second robot.

7. The method of claim 6, wherein the first robot sensors comprise a first vision sensor generating the images for the training examples of the first group, wherein the second robot sensors comprise a second vision sensor generating the images for the training examples of the second group, and wherein a first pose of the first vision sensor relative to a first base of the first robot is distinct from a second pose of the second vision sensor relative to a second base of the second robot.

8. The method of claim 1, wherein the grasp attempts on which a plurality of training examples are based each comprise a plurality of random actuator commands that randomly move the end effector from a starting pose of the end effector to the final pose of the end effector, then grasp with the end effector at the final pose.

9. A robot, comprising:
a vision sensor viewing an environment of the robot;
an end effector;
actuators that control a pose of the end effector;
a user interface input device;
one or more deep neural networks stored in one or more non-transitory computer readable media;
at least one processor configured to:
receive, via the user interface input device, user interface input of a user;
identify, based on the user interface input, a desired object semantic feature for a grasp attempt;
generate a candidate end effector motion vector defining motion to move the end effector from a current pose to an additional pose;
identify a current image captured by the vision sensor, the current image capturing an object in the environment of the robot;
generate output based on processing the candidate end effector motion vector and the current image using the one or more deep neural networks;
determine, based on the output:
that the object has the desired object semantic feature indicated by the user interface input; and
that a measure of successful grasp, of the object with application of the motion defined by the candidate end effector motion vector, satisfies one or more criteria;
responsive to determining that the object has the desired object semantic feature and that the measure of successful grasp satisfies the one or more criteria:
providing an end effector command, that is based on the candidate end effector motion vector, to cause the one or more actuators to adjust the pose of the end effector.

10. The robot of claim 9, wherein the user interface input device includes a microphone and wherein the user interface input is spoken input.

11. The robot of claim 10, wherein the desired object semantic feature defines an object classification.

12. The robot of claim 9, wherein the end effector command is a grasp command.

13. The robot of claim 9, wherein, in the processing, the image is applied to first portion of the one or more deep neural networks and the candidate end effector motion vector is applied to a separate portion of the one or more deep neural networks.

14. The robot of claim 9, wherein the end effector is an astrictive end effector.

15. The robot of claim 9, wherein the end effector is an impactive end effector.

16. A system, comprising:
memory storing a convolutional neural network;
one or more processors executing instructions to:
  identify a plurality of training examples generated based on sensor output from one or more robots during a plurality of grasp attempts by the robots, each of the training examples including training example input comprising:
    an image for a corresponding instance of time of a corresponding grasp attempt of the grasp attempts, the image capturing a robotic end effector and one or more environmental objects at the corresponding instance of time,
    an end effector motion vector defining motion of the end effector to move from an instance of time pose of the end effector at the corresponding instance of time to a final pose of the end effector for the corresponding grasp attempt, and
  each of the training examples including training example output comprising:
    at least one grasped object label indicating a semantic feature of an object grasped by the corresponding grasp attempt; and
  train the convolutional neural network based on the training examples.

17. The system of claim 16, wherein in executing the instructions to train the semantic convolutional neural network based on the training examples, one or more of the processors are to:
  apply, to an additional convolutional neural network, the training example input of a given training example of the training examples;
  generate, over the additional convolutional neural network based on the training example input of the given training example, spatial transformer network parameters;
  use the spatial transformer network parameters to generate a spatial transformation of the image of the given training example;
  generate output over the semantic convolutional neural network based on the spatial transformation of the image; and
  update the semantic convolutional neural network based on the output and the training example output of the given training example.

18. The system of claim 17, wherein in executing the instructions one or more of the processors are further to:
  train the additional convolutional neural network based on the training examples.

19. The system of claim 18, wherein in executing the instructions to train the additional convolutional neural network based on the training examples, one or more of the processors are to:
  generate, over the additional convolutional neural network based on applying the training example input of the given training example to the additional convolutional neural network, a predicted grasp measure; and
  update the additional convolutional neural network based on the predicted grasp measure and the training example output of the given training example.

20. The system of claim 16, wherein the training examples comprise:
  a first group of the training examples generated based on output from a plurality of first robot sensors of a first robot during a plurality of the grasp attempts by the first robot; and
  a second group of the training examples generated based on output from a plurality of second robot sensors of a second robot during a plurality of the grasp attempts by the second robot.

* * * * *